(12) United States Patent
Neville et al.

(10) Patent No.: US 11,836,772 B2
(45) Date of Patent: *Dec. 5, 2023

(54) EQUIPMENT STAGING APPLICATION AND PLATFORM

(71) Applicant: UNITED RENTALS, INC., Stamford, CT (US)

(72) Inventors: Kevin Neville, Poughquag, NY (US); Kenneth J. Taalman, Hudsonville, MI (US); Michael R. Brown, Highlands Ranch, CO (US); Richard Cunliffe, Seattle, WA (US)

(73) Assignee: UNITED RENTALS, INC., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,393

(22) Filed: May 27, 2022

(65) Prior Publication Data

US 2022/0292556 A1  Sep. 15, 2022

Related U.S. Application Data

(63) Continuation of application No. 15/516,823, filed as application No. PCT/US2015/036702 on Jun. 19, 2015, now Pat. No. 11,379,893.

(51) Int. Cl.
*G06Q 30/06* (2023.01)
*G06Q 30/0645* (2023.01)
(Continued)

(52) U.S. Cl.
CPC .......... *G06Q 30/06* (2013.01); *G06F 3/0481* (2013.01); *G06Q 10/06* (2013.01);
(Continued)

(58) Field of Classification Search
CPC .......... G06F 3/0481; G06F 2209/5014; G06F 9/44505; G06F 3/048; G06F 3/0484; G06Q 10/02; G06Q 30/0645; G06Q 10/06; G06Q 30/06; G06Q 20/204; G06Q 40/125; G06Q 10/021; H04W 4/02; H04L 67/02;
(Continued)

(56) References Cited

U.S. PATENT DOCUMENTS 11,379,893 B2 * 7/2022 Neville .................. G06Q 10/06
2002/0082966 A1 * 6/2002 O'Brien ................ G06Q 30/06
705/36 R
(Continued)

*Primary Examiner* — Peter Ludwig
*Assistant Examiner* — Avia Salman
(74) *Attorney, Agent, or Firm* — K&L Gates LLP

(57) ABSTRACT

In various embodiments, an application and platform comprising systems and methods for staging equipment rentals is given. In association with an equipment rental facility, a mobile application can be utilized to identify the nature, quantity and maintenance condition of selected equipment assets that can be rented. The mobile application can identify the staging status of a specific equipment asset, facilitating efficient selection of desired equipment assets in advance of arrival of a customer. Staging status, and additional parameters, can be displayed and acted upon based on visual elements in association with the mobile application such as color, icons, or other visual elements, and first and second visual elements can be used to provide significance.

9 Claims, 40 Drawing Sheets

(51) Int. Cl.
  *G06F 3/0481* (2022.01)
  *G06Q 10/06* (2023.01)
  *G06Q 10/02* (2012.01)
  *H04L 67/02* (2022.01)

(52) U.S. Cl.
  CPC ......... *G06Q 30/0645* (2013.01); *G06Q 10/02* (2013.01); *H04L 67/02* (2013.01)

(58) Field of Classification Search
  CPC ...... Y04S 10/54; G07F 17/0057; G07F 15/06; G05B 2219/31467; G05B 19/418; G05B 2219/25067; G05B 2219/31472; G05B 2219/32128; G05B 2219/23274; G05B 2219/33111
  See application file for complete search history.

(56) References Cited

U.S. PATENT DOCUMENTS

| | | | | |
|---|---|---|---|---|
| 2003/0177044 | A1* | 9/2003 | Sokel | G06Q 10/02 705/5 |
| 2004/0039612 | A1* | 2/2004 | Fitzgerald | G06Q 30/0645 705/5 |
| 2015/0105878 | A1* | 4/2015 | Jones | G05B 19/4188 700/83 |
| 2016/0042423 | A1* | 2/2016 | Henry | G06Q 30/0645 705/26.61 |

* cited by examiner

|  |  |  |  |  |  |  |  |  |
|---|---|---|---|---|---|---|---|---|
| RAESGM | | | Equipment Staging | | Sys: | URASDEV | | ← 855 |
| | | | | | Cmp: | U1 Loc: 232 | | ← 856 |
| | | | | | Mode: | UPDATE | | ← 857 |
| | | | | | Pri: | QPRINT | | ← 858 |
| 850 → Reservation#: | 123270908 | | | | | | | |
| 851 → Customer ...: | F. ROSS INCORPORATED | | | | | | | |
| 852 → Needed by...: | 10/22/15 | 13:00 ~ 854 | | | | | | |
| | 853 | | | | | | | |
| Description | | Qty | Equipment # | Meter | Mechanic | Rdy | Loc | WIP |
| 810 → COMPRESSOR 175-195 CFM | | 1 | 10115306 | 896.600 | UR805RC | N | 232 | Y ← 830 |
| 820 → BREAKER PAVEMENT AIR 60 # | | 1 | | | | N | 232 | N ← 840 |

| | | | | | | | | |
|---|---|---|---|---|---|---|---|---|
| RAESGM | | Equipment Staging | | | Sys: | URASDEV | | |
| | | | | | Cmp: | U1 Loc: 232 | | |
| | | | | | Mode: | UPDATE | | |
| | | | | | Prt: | QPRINT | | |
| Reservation#: | 123271698 | | | | | | | |
| Customer...: | F. ROSS INCORPORATED | | | | | | | |
| Needed by...: | 10/22/15 | 15:25 | | | | | | |
| Description | | Qty | Equipment # | Meter | Mechanic | Rdy | Loc | WIP |
| COMPRESSOR 175-195 CFM | | 1 | | | | N | 232 | N |
| COMPRESSOR 175-195 CFM | | 1 | | | UR805RC | N | 232 | N |
| COMPRESSOR 175-195 CFM | | 1 | 19115306 | 896.600 | UR805RC | N | 232 | N |

FIG. 9

```
                                              1400
                                               │
 ┌─────────────────────────────────────────────────────────┐
 │ RAESGM              Equipment Staging    Sys:  URASDEV  │
 │                                          Cmp:  U1 Loc: 232 │
 │                                          Mode: UPDATE   │
 │                                          Prt:  QPRINT   │
 │ Reservation#:   123271098                               │
 │ Customer...:    JON LIN INCORPORATED                    │
 │ Needed by..:    10/22/15  15:25              1440       │
 │                                               │         │
 │         Description      Qty  Equipment#  Meter  Mechanic  Rdy  Loc  WIP │
1410─ COMPRESSOR 175-195 CFM   1                              N   232  N  ─1442
1420─ COMPRESSOR 175-195 CFM   1   1215805   1002.800  UR805RC  N   232  Y  ─1452
1430─ COMPRESSOR 175-195 CFM   1   10115306   896.600  UR805RC  Y   232  Y  ─1462
 └─────────────────────────────────────────────────────────┘
                                              1450   1460
```

FIG. 14

```
RAESGM                      Equipment Staging       Sys:  URASDEV
                                                    Cmp:  U1 Loc: 232
                                                    Mode: UPDATE
                                                    Prt:  QPRINT
Reservation#:  121639264
Customer...:   JON LIN INCORPORATED
Needed by..:    9/28/15   5:00

Description                    Qty  Equipment #  Meter    Mechanic  Rdy  Loc  WIP
LIGHT TOWER TOWABLE SMALL       1   ----------   -------  UR805RC   N    232   N    — 2410
LIGHT TOWER TOWABLE SMALL       1   19196662     408.500  UR805RC   C    232   Y    — 2420
LIGHT TOWER TOWABLE SMALL       1   1176287      2669.600 UR805RC   C    232   Y    — 2430
```

FIG. 24

```
RAESGM                          Equipment Staging      Sys:  URASDEV
                                                       Cmp:  U1 Loc: 232
                                                       Mode: UPDATE
                                                       Prt:  QPRINT Reservation#:   121639264
Customer....:   F. ROSS INCORPORATED
Needed by...:    9/28/15   9:00

Description                    Qty  Equipment #   Meter    Mechanic   Rdy   Loc   WIP
LIGHT TOWER TOWABLE SMALL       1   10186662     408.500   UR605RC    Y     232   Y   ~ 2510
LIGHT TOWER TOWABLE SMALL       1   1176267      2669.600  UR605RC    Y     232   N   ~ 2520
```

FIG. 25

EQUIPMENT STAGING APPLICATION AND PLATFORM

The present application is a continuation of co-pending U.S. patent application Ser. No. 15/516,823, filed Apr. 4, 2017, which is a national stage application under 35 U.S.C. § 371 of PCT Application Serial No. PCT/US2015/036702, filed Jun. 19, 2015 and which are incorporated herein by reference in their entirety.

BACKGROUND

Equipment rental providers give customers as-needed access to equipment and tools of all kinds for construction, industrial and residential uses where customers are free from the burden of capital investment, storage and maintenance associated with equipment ownership. From backhoes to bulldozers, trench brace systems to transformers, generators to excavators, and for items that can weigh several pounds to many tons, more than 3000 types of equipment and tools can be made available for short- or long-term rental for nearly any purpose. The ready availability of such rentals yields efficient use of resources from large commercial enterprises to individual homeowners, promoting economic growth and productivity.

A given equipment rental facility can have hundreds of category-types of equipment or tools, and even more than one thousand. Typically there is constant vehicular traffic entering and exiting the site to take possession of and/or unload equipment, with trucks and other carriers loading and unloading. The facility itself can have significant vehicular congestion, not to mention foot traffic by customers or drivers acting as their agents, creating potential inefficiencies, delays and safety issues from contending with large and sometimes hazardous items. In addition, customers often look to equipment rental providers for heavy equipment, which not only can weigh many tons but be bulky, unwieldy or otherwise difficult to transport within the facility. Further, with the ever-increasing demand for equipment rental, sites must handle dozens if not more loadings and unloadings a day.

There is a need for efficient systems and methods for efficiently matching customers with equipment to maximize throughput in an equipment rental site, thus promoting best utilization of equipment, generating higher revenues, and enhancing customer and employee safety.

DRAWINGS

The features of the various embodiments are set forth with particularity in the appended claims. The various embodiments, however, both as to organization and methods of operation, together with advantages thereof, may best be understood by reference to the following description, taken in conjunction with the accompanying drawings as follows:

FIG. 8 illustrates one embodiment of a display o associated with an application connected to a staging application.

FIG. 9 illustrates one embodiment of a display associated with an application connected to a staging application.

FIG. 14 illustrates one embodiment of a display associated with an application connected to a staging application.

FIG. 24 illustrates one embodiment of a display associated with an application connected to a staging application.

FIG. 25 illustrates one embodiment of a display associated with an application connected to a staging application.

DESCRIPTION

Figure 1:
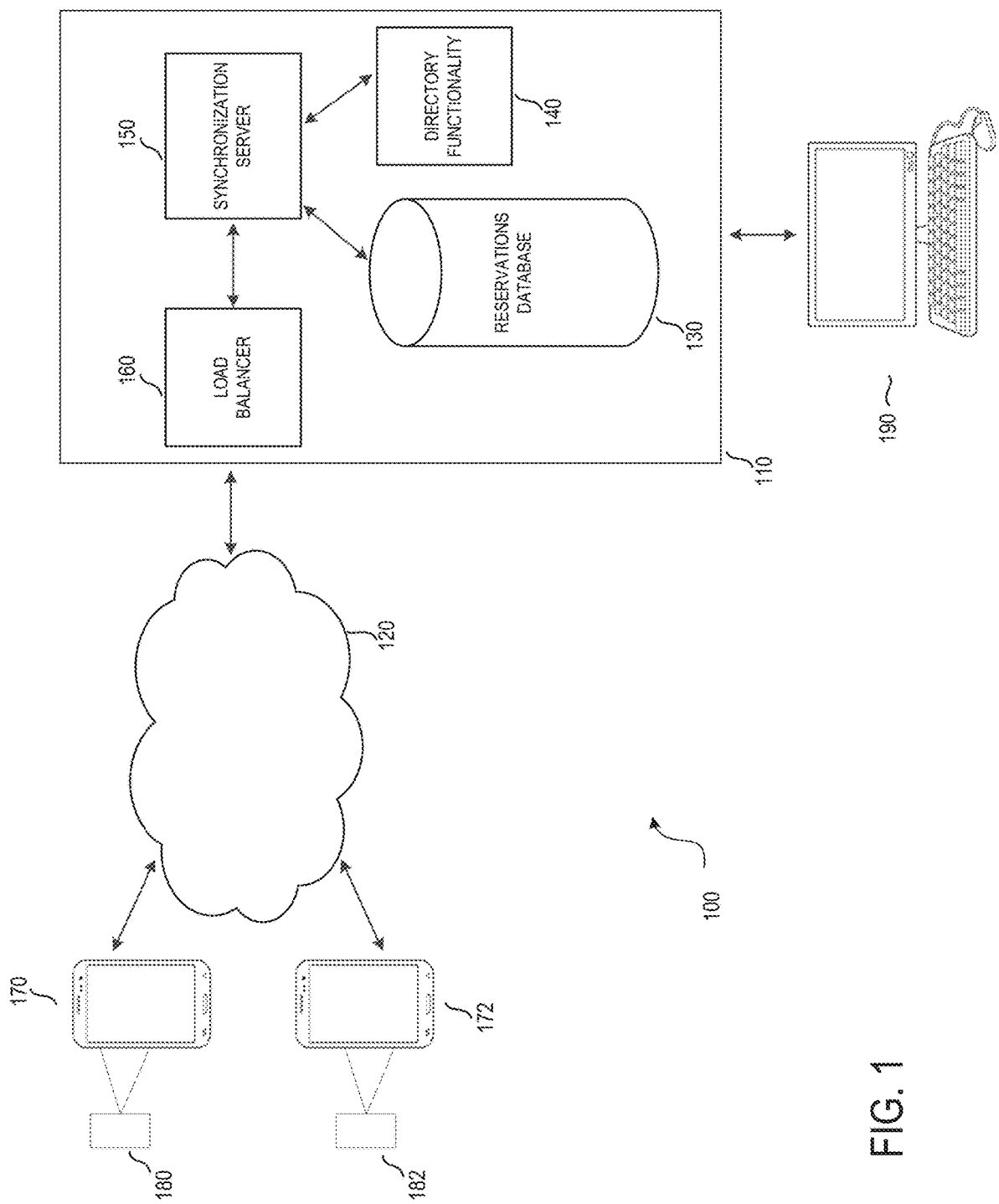
FIG. 1 illustrates one embodiment of a computing environment for staging equipment rental assets.

In various embodiments, a computer-implemented system and method, and associated application and platform, for equipment rental is disclosed.

It will be appreciated that there are numerous challenges for equipment rental entities. A desired equipment asset can be in control of the equipment rental entity but not be located on site at a facility. An equipment asset can be physically on site, but not at a suitable location for taking possession by a customer on site (e.g., blocked by other equipment assets, in an area with substantial foot traffic and so difficult to take possession of, etc.). Also, an equipment asset may be on site and at a suitable physical location for possession to be taken, but not be ready (maintenance may not be completed, or proper approvals may not have been obtained). And, if an equipment asset is on site, at a suitable physical location for possession to be taken, and ready for transfer of possession, an employee of the equipment rental company may be tied up with other customer matters. Even more, if an equipment asset is on site, at a suitable physical location for transfer of possession, and is ready for transfer of possession to a customer, and the employee is set to provide the equipment asset to a customer, the customer could cancel at the last minute, meaning that this equipment asset—which can weigh many tons, and be cumbersome—may now block other loadings or unloadings.

Staging can be considered deploying equipment assets in such a way as to enhance, maximize and/or optimize efficient transfer of possession of an equipment asset to a customer. An application and platform for staging systems and methods can facilitate deploying assets in a certain manner in an equipment rental facility, implementing certain processes with predetermined activities and/or sequences, and configuring computer-based applications to deploy assets in a predetermined manner. As used herein, "customer" can mean the paying customer to whom an equipment asset will be delivered at a place of the customer's choosing or for whom a staging activity will be performed at the equipment rental site; thus such customer can take possession at the equipment rental facility or at a place of the customer's choosing. Further, in a suitable context "customer" can also mean a driver engaged at the direction of the equipment rental facility who can take possession of and deliver the equipment asset to an ultimate customer.

Reference will now be made in detail to several embodiments, including embodiments showing example implementations of a system, method and application and platform for staging systems and methods for equipment rental. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

In embodiments, FIG. 1 is a simplified diagram illustrating a non-limiting computing environment 100 for equipment staging, such computing environment 100 capable of comprising an application and platform, or interoperating with added components to provide application(s) and platform(s), including comprising systems and methods. The computing environment disclosed in FIG. 1 can include a staging application 110. Staging application 110 can have multiple functional components providing staging mechanisms. Staging application 110 can include a reservations database 130. Reservations database 130 can be populated with multiple fields, including a field that stores requests for a given equipment item on a given date and/or time, that stores a listing of potentially available equipment that can meet the needs of the requested reservation, special requests and/or needs by the customer, and other information related to reserving an item of equipment. Reservations database 130 can assist with the rental flow process, including staging of rental assets at an equipment rental site for customers and/or customer pickup. Staging application 110 can comprise a functional component that can provide directory functionality 140, such as an LDAP (Lightweight Directory Access Protocol) component or the like that can enable access of information stored in structures such as directories. Such directory functionality can be used for among other things authenticating a user id and password from a mobile device 170.

It will also be appreciated that the device referred to need not be considered mobile; in other words, a stationary computer or laptop, or other processor-based device, can be used. It will be appreciated that an individual implementing the mechanisms herein can engage actively with other individuals in the rental facility during ordinary activities, have the flexibility to interact with an equipment asset in question such as scanning a barcode or identifying and entering an equipment number, and generally have access to more of the overall environment thereby providing maximum knowledge, efficiency, and customer-service as part of the equipment rental experience. In other words, close physical proximity of the device with the equipment asset can present added opportunities. Close physical proximity can comprise visual contact of the user who is using the device and able to perceive details of the equipment asset including but not limited to an equipment identifier number on the asset, where the user is in the equipment rental yard.

Staging application 110 can include a synchronization server 150, which can assist in providing synchronizing services to one or more elements of computing environment 100; for example, if a user makes a change at mobile device 170—which can be accessible, via network 120, to staging application 110—mobile device 170 can establish communication with synchronization server 150 to commit the changes to reservations database 130 or one or more added functional components. Such synchronization can be carried out in various ways such as by a RhoConnect application. In addition, a task queue and/or prioritization process can be established in conjunction with synchronization server 150. Such process(es) can be set up to obtain new data related to reservation and equipment that can be conveyed to and/or from reservations database 130. A task implementation and queuing process, such as but not limited to Redis, can be used to accomplish this function. When a user logs in, the user can enter a user id, password and/or other information (such as site identifier, or branch). The application can pull data from the task implementation and queuing process for data associated with the log-in. If no or limited connectivity is available with an element in staging application 110, or with an element in communication with staging application 110, changes can be stored locally in mobile device 170 (or remotely as in another device, such as cloud storage associated with network 120). Synchronization server 150 can periodically refresh data in an application stored locally on mobile device, or an application in operative communication with mobile device 170, to correspond to the current state of equipment reservations reflected in reservations database 130. It will be appreciated that mobile devices 170, 172 can be used in areas with spotty coverage (cellular, WiFi, or other); as a result, staging application 110 can be configured to enable processing where communications are not uniformly available. For example, rules can be put in place such that reservations database 130 can be consulted first in the event of a partial or full failure of communication by a mobile device 170 and/or staging application 110 itself. In any event, measures can be put in place so that information is guaranteed to be delivered from mobile device 170 to staging application 110 and vice versa, or such chance is maximized, and a user can be notified of a suboptimal condition to enable the user to take remedial steps. However, it can be desirable to minimize latency, thereby communicating an action reflected on reservations database 130 to mobile device 170 within minutes. Mobile device 170 can be managed by an Enterprise Mobility Management (EMM) application such as but not limited to SOTI, and can communicate with staging application 110 via a network 120 configured as desired by mechanism of, for example, secure HTTPS public domain encrypted connection, or a virtual private network (VPN).

It will be appreciated that staging application 110 can comprise multiple architectures. Staging application 110 can be conceptualized as embracing components 130, 140, 150, 160 within staging application; however, staging application can also be conceptualized as having one or more of these components outside of, remote to, or otherwise not directly within staging application 110 from an architectural point of view (or even absent therefrom) so long as such components can be in operative communication, wherever and how they may be constituted, with staging application 110.

In addition, mobile device 170 can represent any processor-based or processor-associated device. This can include a smart phone, tablet, personal digital assistant (PDA) or the like, glasses, watch, or other device capable of functioning in association with a processor and display.

Further, a load balancer 160 can provide load balancing functionality with respect to synchronization server 150, thus managing demands by multiple users via mobile devices 170, 172, and of course many additional mobile devices.

It will be appreciated that many configurations and architectures can be employed to carry out the mechanisms disclosed herein. As but one example, synchronization server 150 can comprise two or more synchronization servers.

In embodiments, staging application 110 can be accessed by an application on mobile device 170. In these embodiments, a mobile application 180—a "mobile app"—can be loaded onto mobile device 170, and can provide for a user interface, including a graphical user interface, and functionality permitting user communication with staging application 110, as discussed below. Mobile app 180 can be substantially similar or identical to a mobile app 182 loaded to mobile device 172, or it can be dissimilar in some or many ways. In this manner an individual at an equipment rental site can utilize data from database 130, and this individual, who may be given the role of an equipment associate, can enable the staging of equipment remotely from any point within the yard of the site, or from a location outside of the site. In accord with embodiments, changes in the state of database 130 and other components associated with staging application 110, can be reflected periodically on the equipment associate's mobile device 170, and vice versa.

Each of functional components 130, 140, 150, 160 in staging application 110 can be in interoperative communication with one or more other components in staging application 110, and as appropriate in interoperative communication with added functional components, local or remote, that can be in interoperative communication with staging application 110.

Mobile application 180 can enable user login with a network id (user id) and password, along with entry of the branch location. On login, mobile app 180 can download information based on the current state of reservations database 130, and staging data from synchronization server 150. Mobile app 180 can open to a main/home screen and display staging data at a reservation level.

Such reservation level can reflect relative urgency of each reservation's staging. For example, if greater than 30 minutes until the equipment asset is planned to be picked up, no icon can be shown; if less than or equal to 30 minutes, a "warning" icon can be shown; if zero minutes or overdue a "late" icon can be shown. Thus, windows of time can be identified within which a given urgency status can be provided. As time until equipment pickup (or other activity) decreases, an urgency status can change. This change in urgency status can be reflected as a visual element(s) displayed on mobile device 170.

A reservation's staging status can be shown as a symbol or icon: O for Open, W for Work in Progress, D for staged (Done), and C for Changed. The number of records to be staged for a reservation can be shown. Reservation staging status can be shown as a background color: Black for Open, Yellow for WIP, Green for Staged (Done), and Red for Changed. Other colors can be selected, for these screens and other screens, as desired. It will also be appreciated that a text color can be based on effectiveness and/or readability. For example, where not inconsistent with effectiveness and/or readability, text color can be black or a dark color against a lighter background, or white or a light color against a black, red, green or yellow background. Other combinations are possible.

On selecting a reservation, mobile app 180 can display a Comments screen; if no comments exist, a reservations detail screen can be displayed. Comments can be displayed on a "last in/first displayed" basis, though other methods can be used. A reservation's Detail screen can be launched on selecting a reservation record on the main screen (if reservation has no associated comments). Also, the Detail screen can be launched on selecting the "Details" button on the "Comments" screen. The Reservation Detail level display can reflect a separate record for each rental asset to be staged; this can be referred to as a Reservation Detail—Staging Record. Each record's staging status can be noted by a single letter icon: O for Open, W for Work in Progress, D for Staged (Done), C for Changed, and V for Void. Each record can reflect the staging status through a background color: Black for Open, Yellow for WIP, Green for Staged (Done), Red for Changed, and Grey for Voided.

An individual Reservation Detail—Staging Record screen can be displayed on selecting a record on the Reservation Detail screen. This display can include: CatClass description (category class); equipment number data field; meter data field, which can record a time period of, or other metric associated with, actual use of an engine or equipment asset; equipment rental status field; WIP button; Complete button; Update button (if already in WIP status).

Mobile app 180 can provide the capability to select an asset to carry out staging. This can be performed by the Reservation Detail—Staging Record screen. Selection of an asset can be accomplished by one or more of: scanning a barcode; typing equipment number (mobile device 170 can display a keyboard when a user touches the equipment number field); selecting from a prioritized list; or by another mechanism. Equipment number can be alphanumeric.

Staging data can be populated for the selected asset. For example, the meter reading can be populated; the asset's rental status can be populated; and the asset can be verified to be in the correct Cat-Class (category class). On entering/scanning the equipment number, mobile device 170 can populate the meter and staging status fields based on equipment available at the site and its status. Meter readings can be numeric and may include a decimal point and several digits. The Status field can display status identifiers: N/A (if Equipment Number is blank); A (if available); Invalid Equipment (if wrong CC (category-class)); D for a major repair; N for a minor repair. Other status identifiers can be used.

Mobile app 180 can select, store and communicate staging data to reservations database 130 such as by interfacing with synchronization server 150 and also by utilizing web services functionality. The Staging status can be set by selecting the "WIP" or "Complete" button on the "Reservation Detail—Staging record" screen. On staging an asset on mobile device 170, mobile device 170 can send the following data to reservations database 130: equipment number, and Staging Status (e.g., Open, WIP, Complete, Void).

The Staged/WIP asset can be displayed on the Reservation "Detail" screen. Mobile app 180 can reflect the staging status of each equipment request on the Reservation "Detail" screen. On selecting a staging status the mobile device 180 can display the status via a staging status icon and by changing the background color of the record on the display of mobile device 170.

The Staged/WIP asset can be displayed on the Main/Home screen.

Each reservation can be accounted for. In embodiments, reservation details records staging status on the Main/Home screen can be set/defined, for example, as follows:
If any single record on the "Reservation Detail—Staging Record" screen has been set to "WIP" the entire reservation details record can be displayed as "WIP"
If all of the reservation details records are set to "Complete" the entire reservation can be set to "Complete" on the main screen, and the reservation can be hidden on the Main/Home screen
If one of the assets is in "Changed" status the record can be displayed as "Changed" on the Main/Home screen. This can be true even if all of the other records are in complete status.

To change the selected/staged asset, actions can be taken. For example, manually entering or scanning the replacement asset's equipment number can be performed, or the existing asset's data in the equipment number and meter fields can be deleted. In addition, if a replacement asset number is entered, mobile device 170 can pull the replacement asset's "meter" value and rental "status" data from the mobile device's 170 memory as downloaded previously. If the existing data is deleted on the mobile device 170, the rental status can be reset. In either case mobile device 170 can update reservations database 130 via synchronization server 150, or other mechanism.

Mobile app 180 can receive periodic updates via synchronization server 150. Such updates can comprise the following. One or more items can be added to a reservation that needs to be staged. A Reservation Record on the Main/Home screen can be updated to reflect a change in number of records to stage. Added record(s) can be visible on the Reservation "Detail" screen with the reservation's other staging records. If a reservation is already fully staged and hidden on the Main/Home screen, the Reservation level record can be updated to reflect the additional item; the status of the reservation can be changed to WIP, and the reservation record can be unhidden on the Main/Home screen.

In addition, items can be removed from a reservation. In embodiments, one or more items originally on a reservation can be removed. With respect to the Main/Home screen, a Reservation Record can be updated to reflect the reduction in number of records to stage. The Reservation Record's staging status icon on the Main/Home screen can be updated to "C" (changed) and the reservation record's background color can be changed to Red. Regarding the Reservation "Detail" screen: removed record(s) can be visible on the Reservation "Detail" screen, a record can reflect the "C" Changed status Icon, and/or a record can bear a Red background color. With regard to the Staging Record screen: selecting the Changed record on the "Reservation "Detail" screen" can launch a Staging record screen where the previously staged asset's data is displayed on a Red background with an "Unstage/Void" button. Also, selecting the unstaged Void button can change the record from a "C" to a "V" status, and can change the background color of the record from Red to Grey. An updated "V" status can be communicated to reservations database 130 via synchronization server 150, or other mechanism.

If connectivity is lost, mobile device 170 can store the data then transmit such when connectivity is reestablished. A Home button can return a user to the top of a Main/Home screen. A Synch button can cause mobile device 170 to communicate with synchronization server 150. A Filter button can include the option of reservations comprising delivery only, non-delivery only, and/or all reservations. A Logout button can log a user off of mobile device 170. A Help button or the like can cause a communication with a Help Desk or electronic version thereof. A Reset DB button can overwrite the mobile device 170 memory with the current version derived from reservations database 130 and/or other staging file. A Search function can permit locating and opening a reservation on mobile device 170; it can be used to access Completed, fully staged reservations. DB/Table refresh functionality can be offered whereby after a configurable period, such as a predetermined number of minutes, the following tables/databases among others can be updated: synchronization server 150 can be updated to match reservations database 130 data; the copy of an equipment list in reservations database 130 and availability status (for staging purposes) can be updated to match the reservations database 130; mobile device 170 can be connected to synchronization server 150 to receive updates from reservations database 130. Automatic logoff functionality can be enabled, whereby mobile device 170 logs off a user if a certain number of minutes have passed. A Menu can be enabled, which can display options such as Home, Filter, Log (which can be associated with Help Desk activities), Synch, Logout, Reset DB. It may be the case that Log and Reset DB will be available to Help Desk users, or additional users. An About button can provide version number, and other information such as Help Desk contact number.

In embodiments, an equipment list can include all asset types excluding the following: S=Sold, T=Stolen, O=On Rent, J=Junked, U=Scheduled for pickup, V=Returned to Vendor, G=Consigned.

Communications between and among mobile devices 170, 172 can be handled by a synchronization client component that can be resident on the mobile device 170, 172 and the synchronization server 150 processes. An ODBC layer setup in association with synchronization server 150 can aid in populating various task/queue processes with the current state of reservations database 130. Changes to reservations database 130 can be handled by web services which can be called as part of an update process.

Users can authenticate and log in by various mechanisms including with a user ID and password and authenticate via directory functionality (e.g., LDAP) 140. A synchronization plugin can assist in this process. Organization-level security can be implemented. Communications can be carried out by secure mechanisms such as https. User activity can be logged in mobile device 170 and available for reconciliation, debugging, and other activities. Data integrity checks can be handled in conjunction with update of web services associated with reservations database 130. An error can generate an error message, and a process undertaken whereby the data can not be committed, an error message thereby being displayed on mobile device 170.

Data managed can include available equipment at the site, equipment that needs staging, and reservation comments.

Example embodiments of staging computing environment 100, such as by utilizing staging application 110, are now presented and example screenshots therefor. It will be appreciated that these are non-limiting, exemplary scenarios and screenshots and are understood to be non-limiting for the reason that many such are possible to be implemented by or in connection with computing environment 100, only selected embodiments are presented herein, and only selected screenshots are presented herein, and others are possible in connection with other systems, methods, and applications and platforms.

Figure 2:
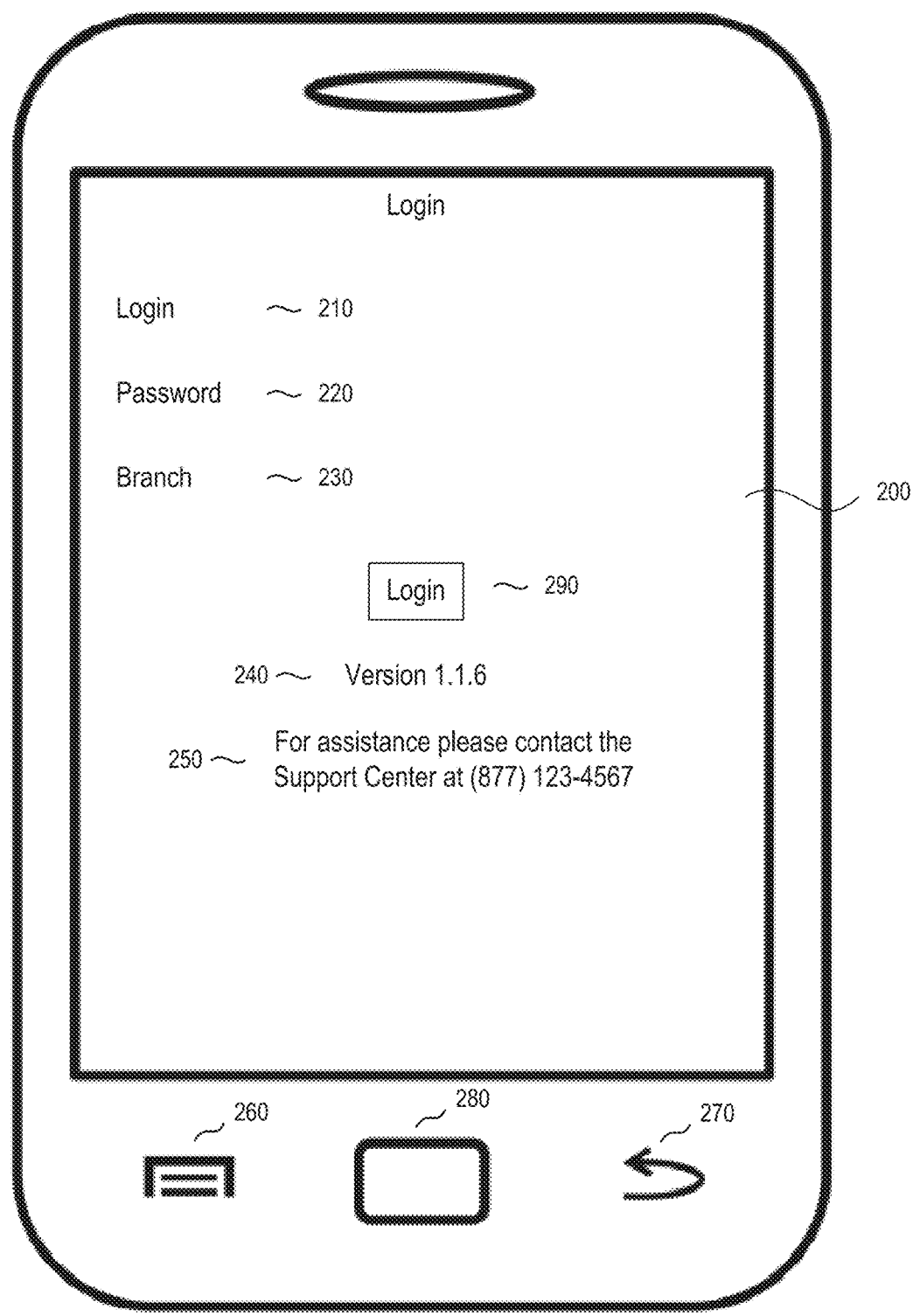
FIG. 2 illustrates one embodiment of a display on a mobile device reflecting a Login screen.

In embodiments, a user employs a mobile app 180 in association with mobile device 170, such mobile app permitting display by virtue of a graphical user interface (GUI) that a Login screen 200 on mobile device 170, as shown in FIG. 2, with Login field 210, Password 220, and equipment rental company Branch 230. One of skill in the art will appreciate mechanisms by which text and/or graphics can be displayed via GUI functionality on a screen, monitor or other mechanism that can enable a user to view, actuate (haptically or not), and otherwise interact with. The GUI functionality can assist in the display, depiction or other provision of visual elements on the display of respective mobile devices 170, 172 in association with instructions from respective mobile apps 180, 182. In addition, GUI functionality can be provided for computer 190 and associated display or monitor therewith, thus providing a display mechanism for a user to interact with staging application 110. The GUIs herein can operate based on many input mechanisms including touch, keyboard or other type of text- or symbolic-based input, audio, other mechanism to detect user input. The GUIs herein can provide counterpart output in corresponding ways.

Figure 3:
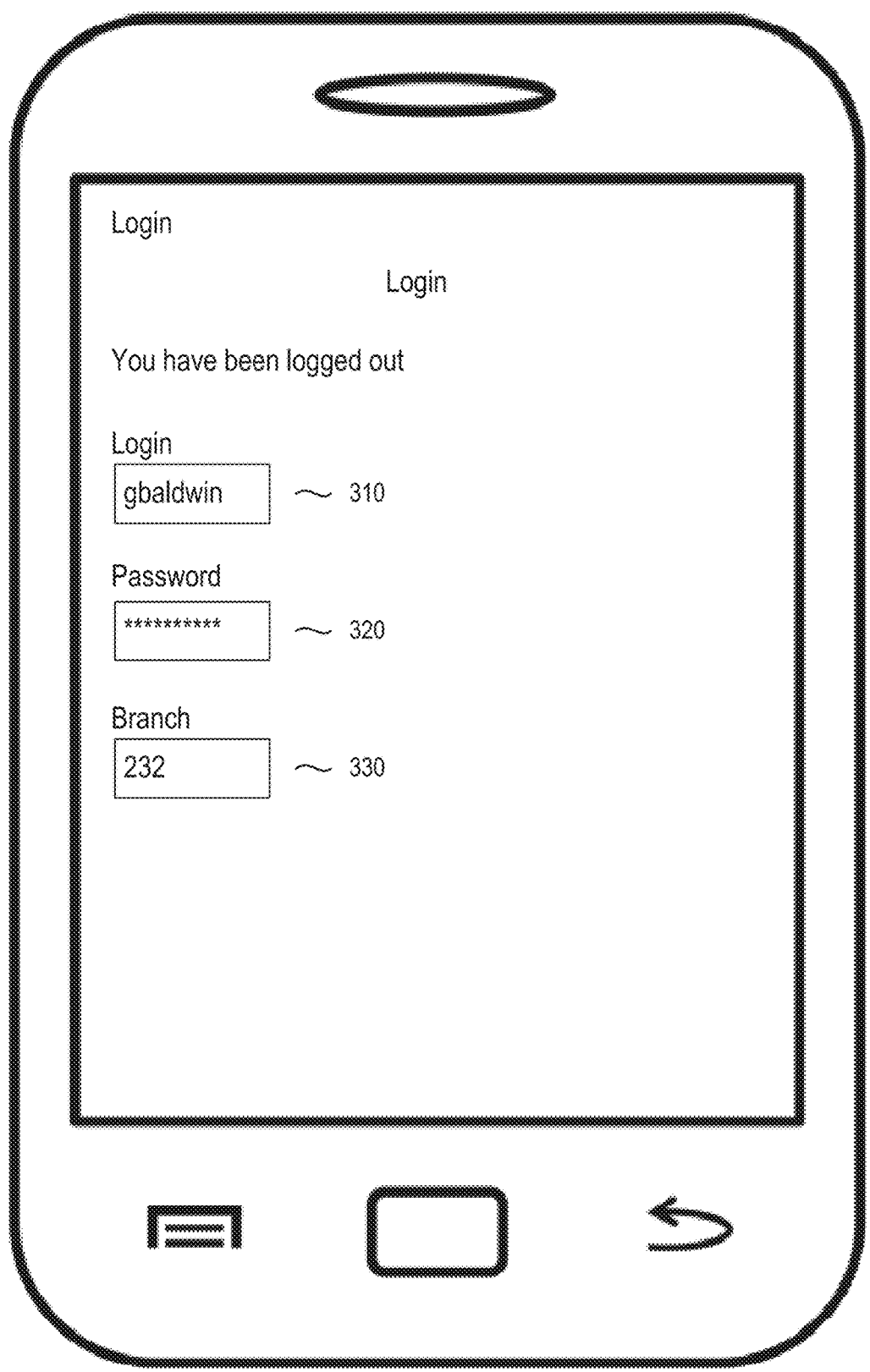
FIG. 3 illustrates one embodiment of a display on a mobile device reflecting actuating a Login field.

When a "Login" button is depressed, as shown in FIG. 3 a login screen 300 can display a Login field 310 that displays a text box that can be filled in by virtue of a keyboard available such as on the display (not shown). Added fields can include that for a Password 320 and Branch 330. Added information can include version number 240, and a phone number to call for assistance 250.

Icons can be displayed on the mobile device 170 by means of GUI functionality as discussed herein, or otherwise be associated with mobile app 180. Such icons can include a menu icon 260, a "Back" icon 270, and "Enter" icon 280.

Figure 4:
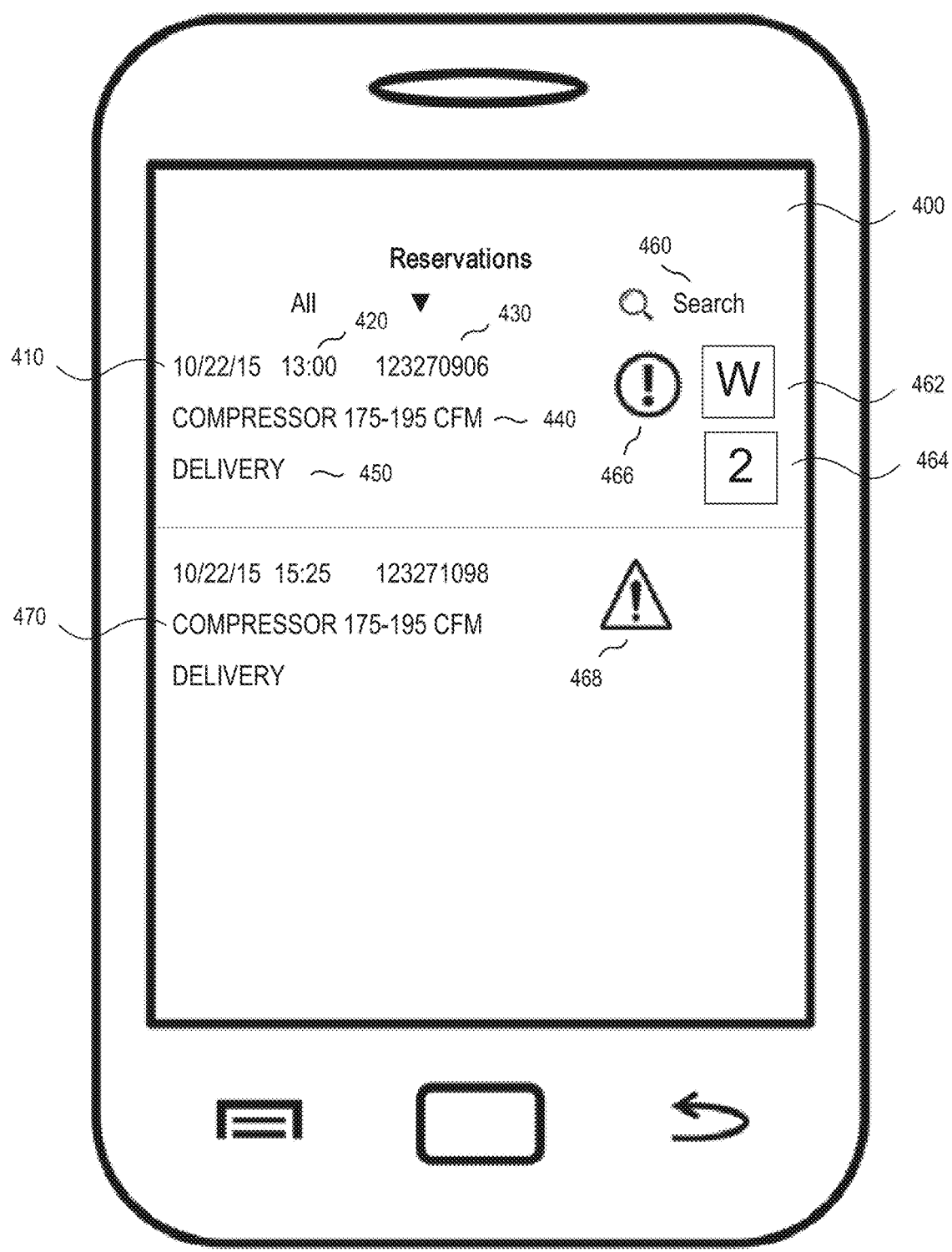
FIG. 4 illustrates one embodiment of a display on a mobile device reflecting a Reservations screen.
Figure 5:
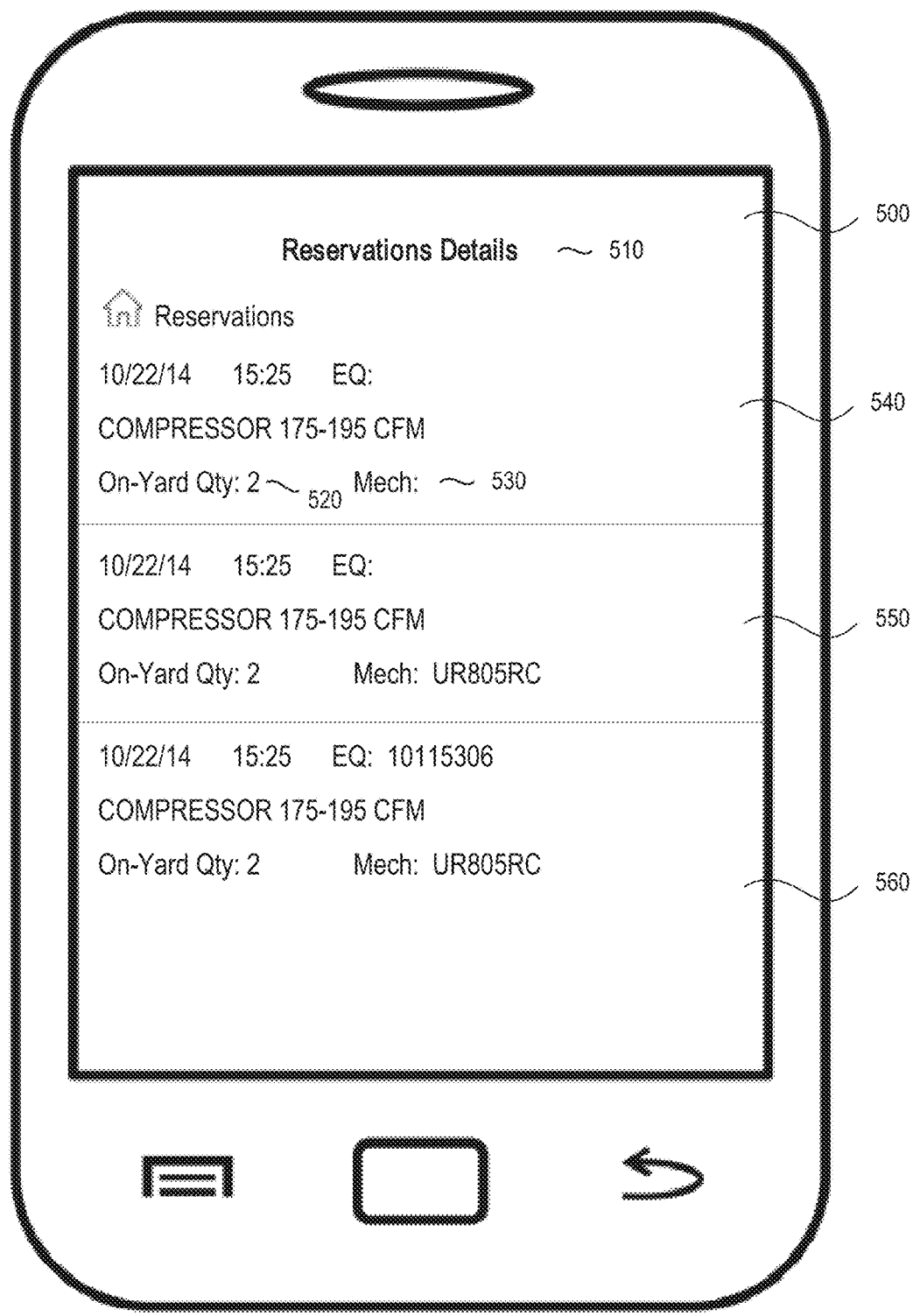
FIG. 5 illustrates one embodiment of a display on a mobile device reflecting a Reservations Details screen.
Figure 6:
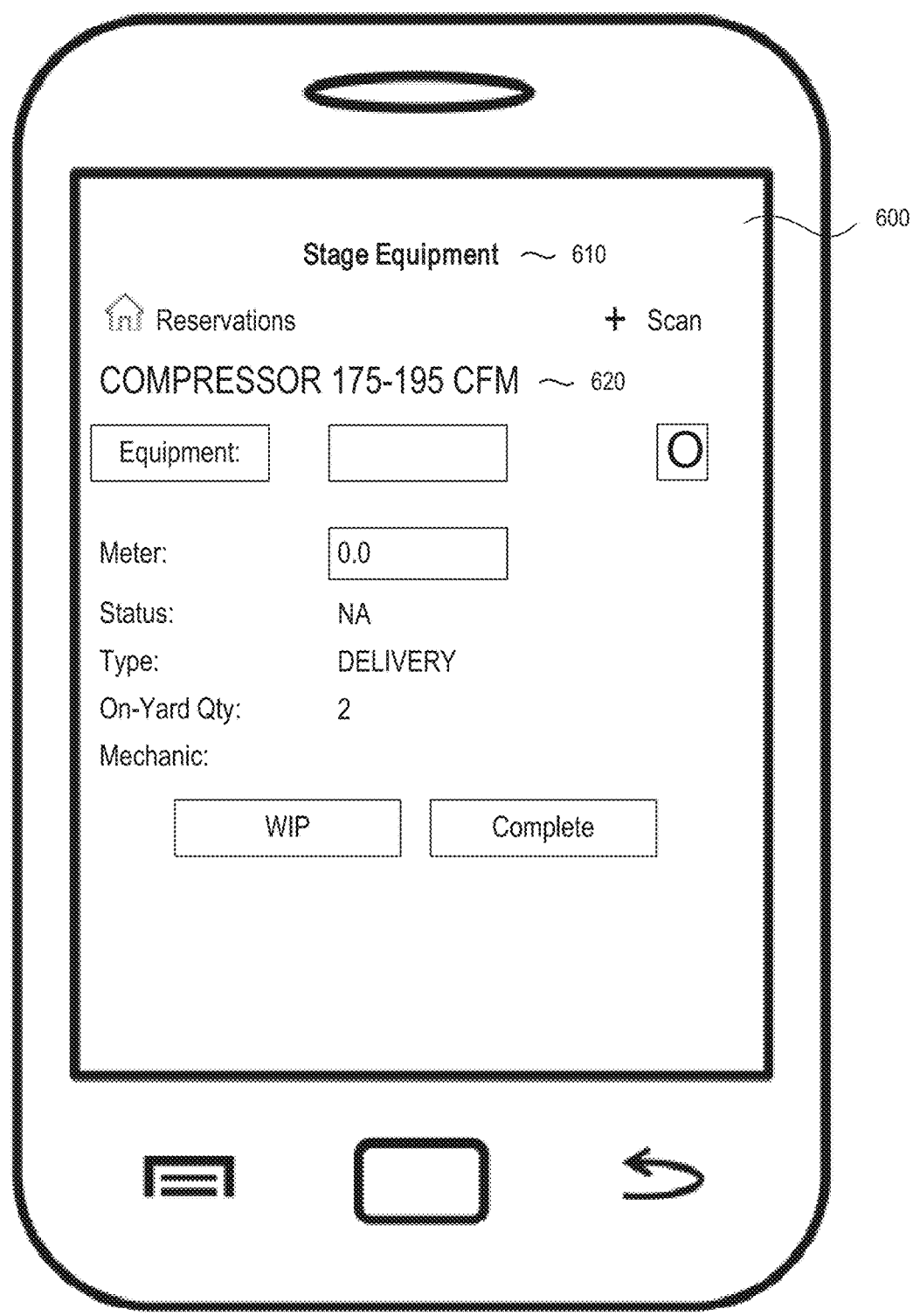
FIG. 6 illustrates one embodiment of a display on a mobile device reflecting a Stage Equipment screen.

In embodiments, there can be at least three types of screens: Reservations 400 as shown in FIG. 4, Reservation Details 500 as shown in FIG. 5, and Stage Equipment 600 as shown in FIG. 6.

In embodiments, the Reservations screen 400 can display un-staged or partially staged reservations going back a certain amount of days in the past to a certain amount of days in the future. Reservations can be displayed in need by date/time order. Each record 410, 470 (here, two are displayed) can indicate the reservation's staging status 462. Staging status can be indicated as O for Open (staging not started), W for WIP (Work in Progress), C for Changed (record to be voided), or another staging status. In addition, a staging urgency identifier can be indicated such as by an icon, wherein an exclamation point in a circle 466 (e.g., a red circle) can indicate that staging is overdue, and an exclamation point in a triangle 468 (e.g., a yellow triangle) can indicate that staging is due in thirty minutes or less. An added identifier 464 can indicate number of assets on the reservation to be staged, such as assets reserved by a customer. Here, there are two compressors of the kind given. It will be appreciated that multiple attributes can be associated with and/or displayed in connection with embodiments herein, such as but not limited to asset number, category class description, staging status, desired time of pickup, deadline(s), location in yard, maintenance status, quantity of items available, urgency status, priority, and many more.

In embodiments, the Reservations Details screen 500 can display all assets on the reservation to be staged. Added information can be seen in the On-Yard Quantity field 520, showing two assets, and a mechanic who can be available 530.

In embodiments, the Stage Equipment screen 600 can display staging/WIP processing as well as warnings, acknowledgments and error connections. For illustrative purposes equipment asset 620 is shown herein.

Figure 7:
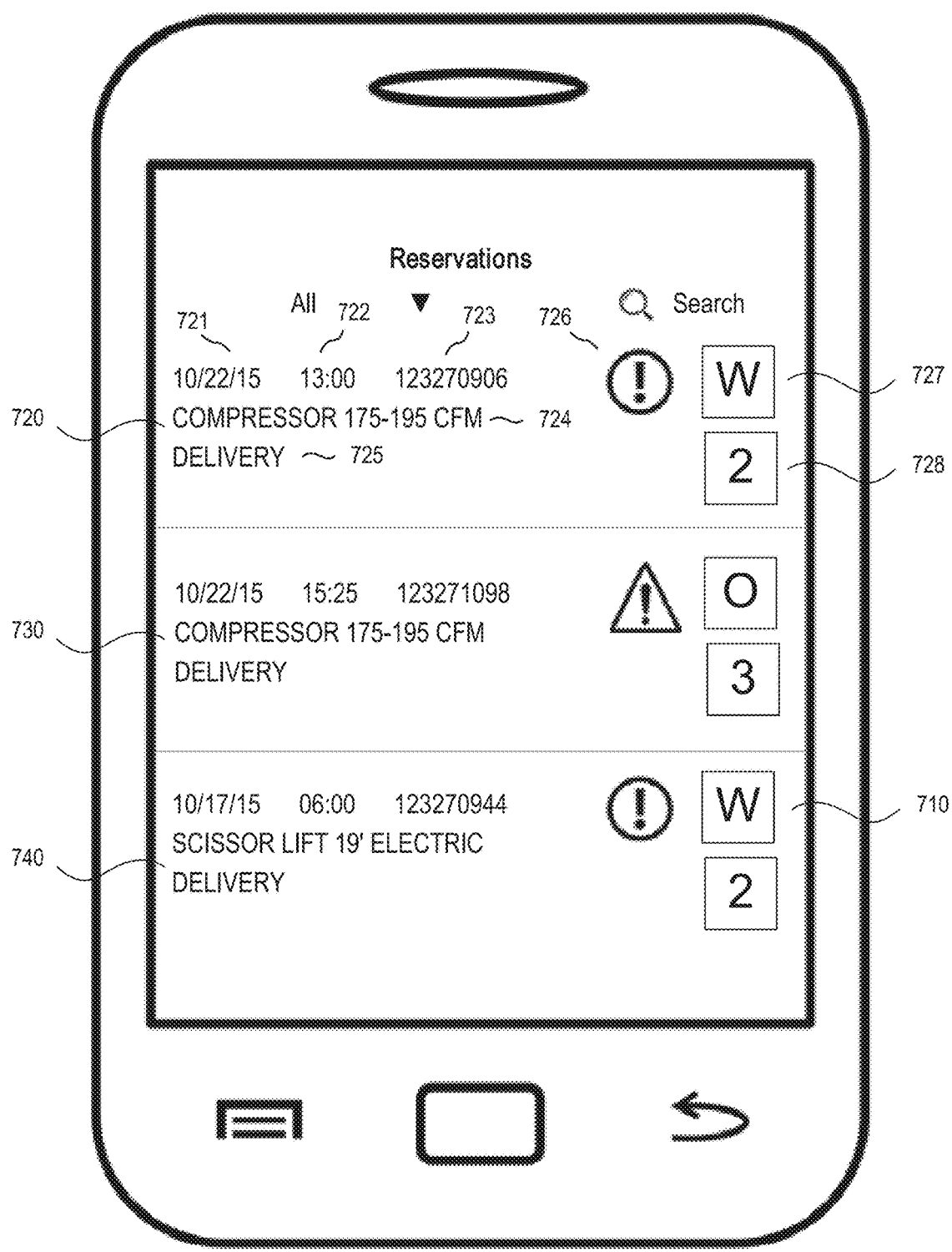
FIG. 7 illustrates one embodiment of a display on a mobile device reflecting a Reservations screen with a warning message.

An example Reservations screen in shown in FIG. 7. Three reservations 720, 730, 740 are displayed. Reservation 720 has a due date 721, a time due 722, a reservation number 723, equipment category class description 724, a designated action 725 (here, delivery in the sense that a customer pickup or "will call" is provided), a status 727, and number of such assets included in reservation 728. It will be appreciated that information and parameters displayed on the Reservations screen can also be displayed in a different format. FIG. 8 shows an example alternate format, such as can be employed with a personal computer, laptop or other device that may not be (or in embodiments may be) a mobile device. Fields that are counterparts to those in FIG. 7—850, 852, 853, 854—are shown in FIG. 8. Added fields are given as well in FIG. 8—851, 855, 856, 857, 858; these fields can optionally be added to the GUI functionality for mobile app 180.

Staging data entered on mobile device 170, such as by mobile app 180, can update staging application 110. In embodiments, then, a mobile app 180 running in association with mobile device 170 can update a reservations screen in a different GUI format, such as that in FIG. 8. In other words, reservation 720 can be reflected in reservation 850; further reservation 730 can be reflected on a screen containing reservation 905, as seen in FIG. 9. In addition, staging data entered via staging application 110 can update mobile device 170 and mobile app 180.

Figure 10:
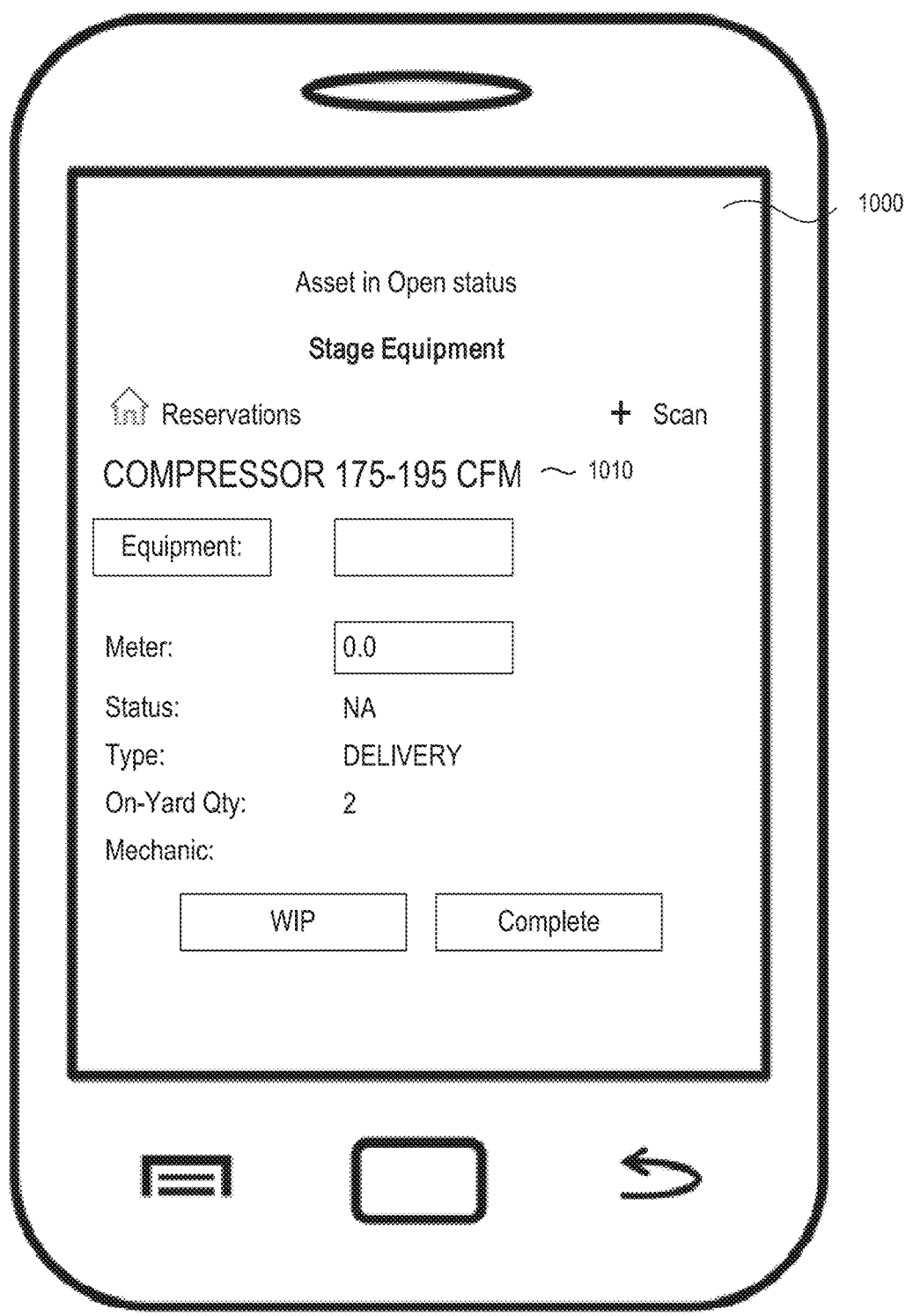
FIG. 10 illustrates one embodiment of a display on a mobile device reflecting an asset in Open status.
Figure 11:
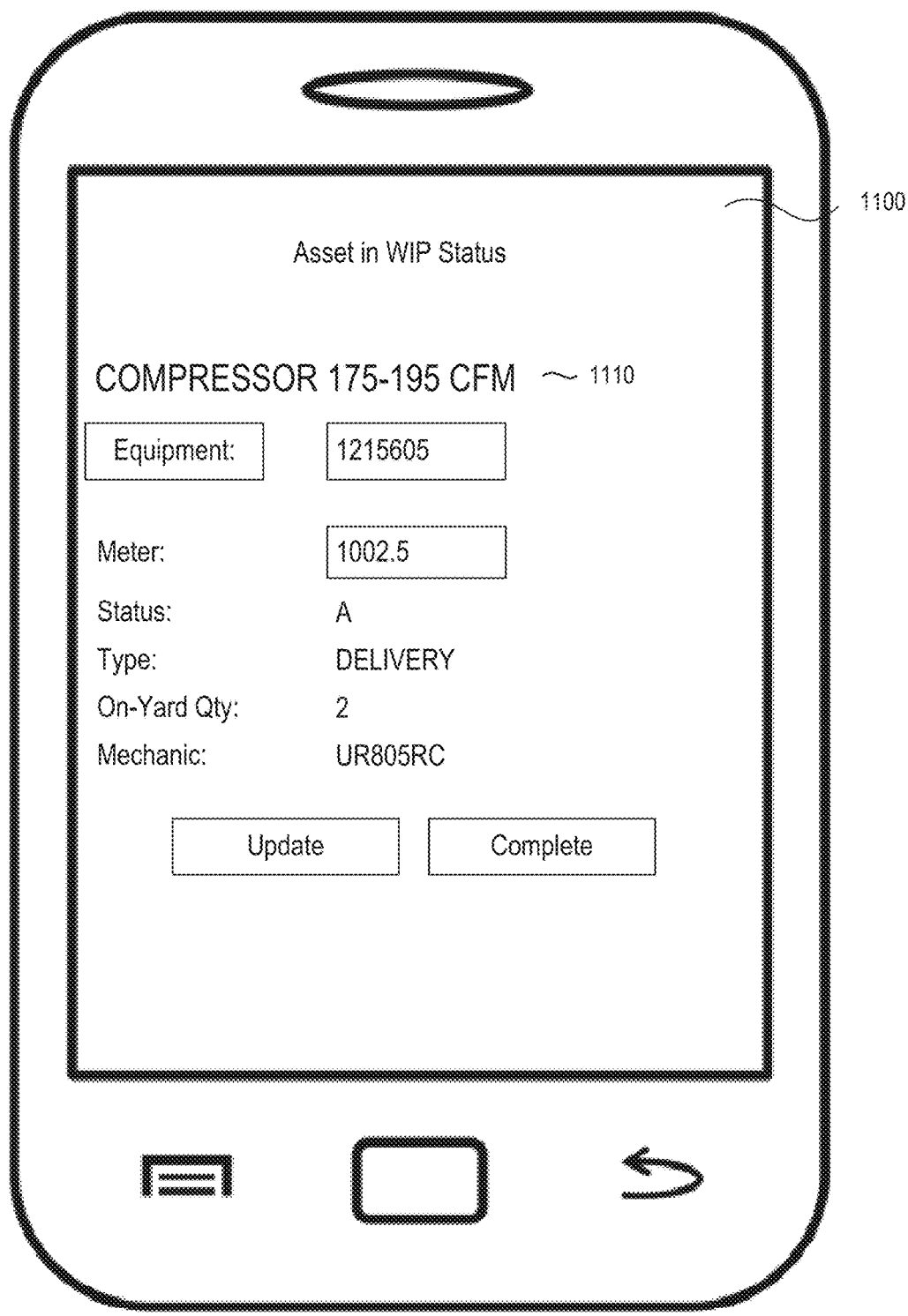
FIG. 11 illustrates one embodiment of a display on a mobile device reflecting an asset in WIP status.
Figure 12:
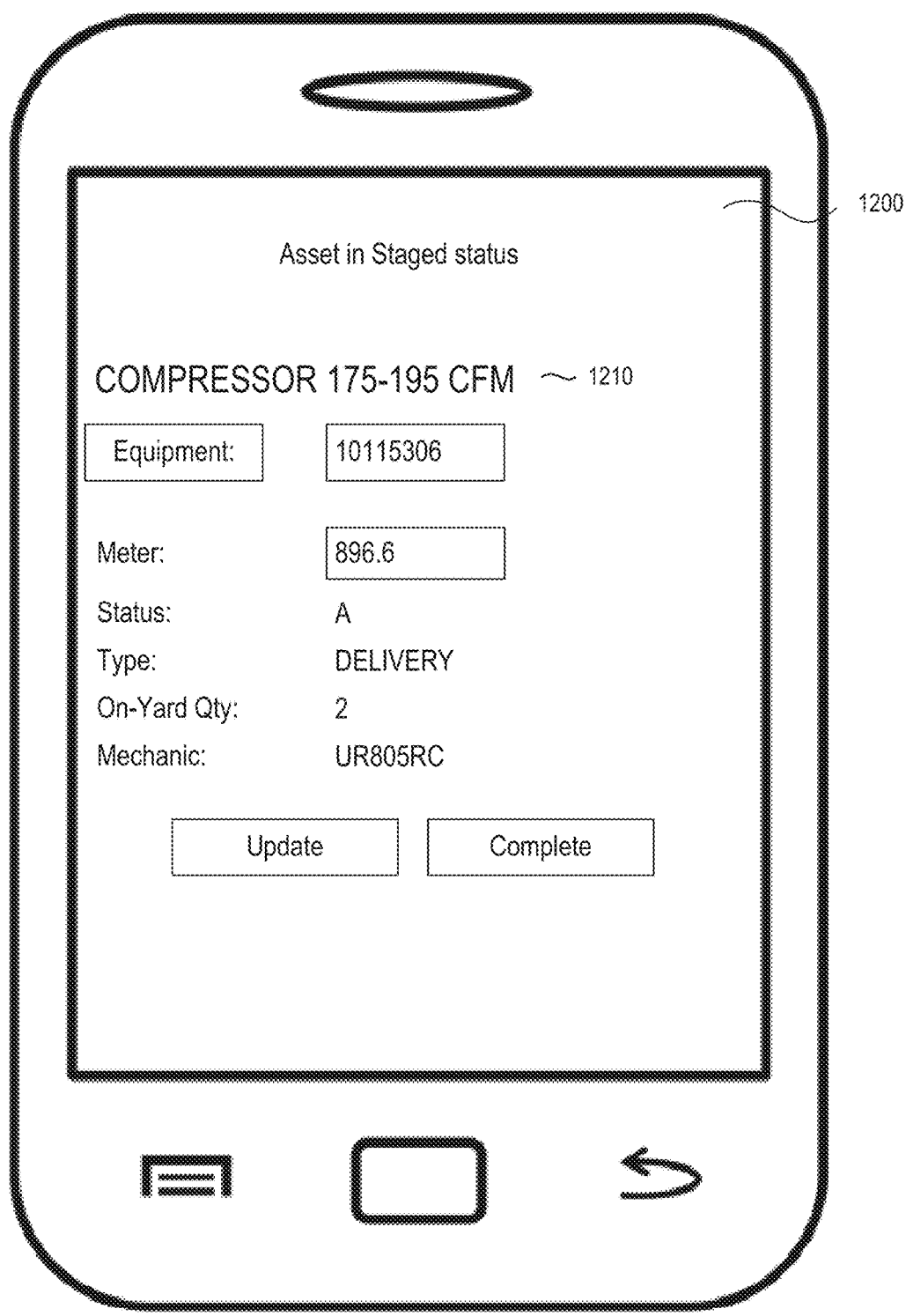
FIG. 12 illustrates one embodiment of a display on a mobile device reflecting an asset in Staged status.
Figure 13:
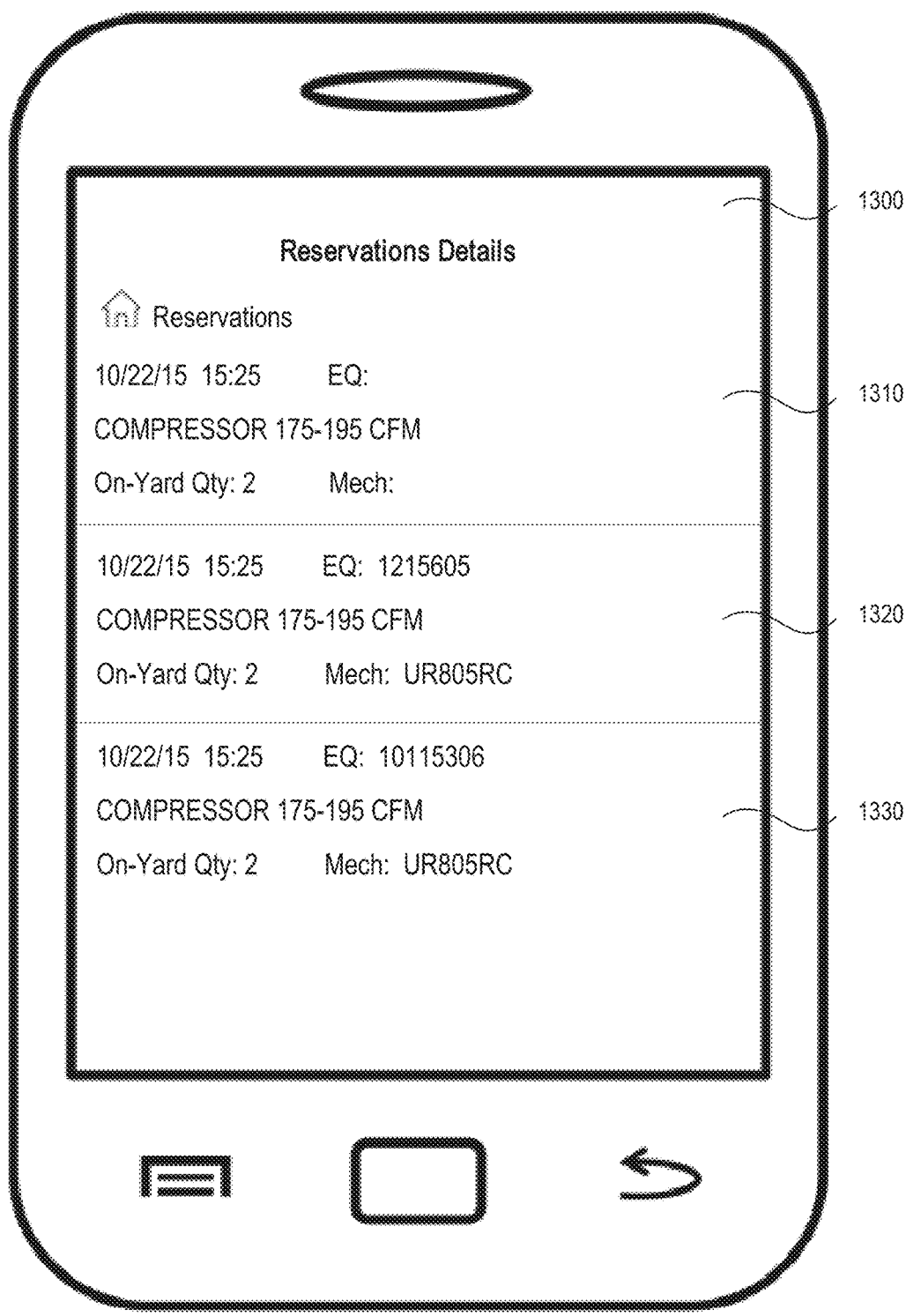
FIG. 13 illustrates one embodiment of a display reflecting a Reservations Details screen.

Rental assets processed by mobile app 180 can flow through to staging application 110, and a GUI representing information from staging application 110. Such GUI can display, depict or otherwise representation information from staging application 110 as displayed on a display or monitor associated with computer 190 and input/output mechanisms therefor. For example, as shown in FIG. 10, a Stage Equipment screen 1000 can show an Asset in Open Status, here asset 1010. (The background can be black to indicate Open.) Further, as shown in FIG. 11, an asset 1110 in WIP status can be shown. (The background can be yellow to indicate WIP.) Even further, as shown in FIG. 12, an asset 1210 in Staged status can be shown. (The background can be green to indicate Staged.) Now, it will be further seen that Reservations Screen 1300, seen in FIG. 13, can incorporate asset status 1010 in a reservations format 1310, can incorporate asset status 1110 in a reservations format 1320, and can incorporate asset status 1210 in a reservations format 1330. (Backgrounds 1310, 1320, 1330 can be colored respectively black, yellow and green.)

There can be value in ordering the manner by which an available equipment asset is displayed. The facility may have access to several assets of the same category class. However, a first such asset may have been rented more recently than a second such asset. If so, there can be value in presenting, on the display, the second asset in the first position such that it has the opportunity to be selected first. In this manner, assets that have experienced a longer time since last rental can be selected first. As a result, overall longevity of the fleet can be enhanced due to balancing out rental characteristics.

Tiebreaker rules can be implemented in this regard. By way of non-limiting example, equipment assets of the same category class can be displayed in the following order on mobile device 170:

(a) Display in order of least-recently rented to most-recently rented (b) If rental date in (a) is same, display in following order of Equipment Status: A, R, N, D. (Where A=Available, R=Needs Ready Inspection, N=Needs Minor Repair, and D=Down for Major Repair.)

(c) If two or more assets would be ordered the same based on (a) and (b), then display in the following order: Available, WIP, Staged, Hold.

Example 1. Based on these tiebreaker rules, if assets 1, 2 and 3 have differing "last rented" dates, then they will be displayed per (a).

Example 2. If asset 1 is the least-recently rented one, and assets 2 and 3 were last rented on the same date, then asset 1 is displayed first and tiebreak rule (b) is applied to assets 2 and 3: if asset 2 is Available, and asset 2 is Needs Ready Inspection, then the final display is in order of 1, 2 then 3. (I.e., 1 can be listed on an upper portion of the display, 2 below 1, and 3 below 2; however, different display orders can be employed.) If, however, assets 2 and 3 are both Available, then tiebreak rule (c) is used. If there is still a tie then the display can be made based on the order of items found in light of host system search criteria used in the host system search engine, or another tiebreaker mechanism.

Added mechanisms for ordering the display can be provided to provide economic advantages, efficiency, and customer-service.

Further, as seen in FIG. 14, a reservations screen 1400 in conjunction with staging application 110 can show corresponding asset statuses in the format herein, 1410 corresponding to 1310, 1420 corresponding to 1320, and 1430 corresponding to 1330.

Giving further details, an open record, whose background can be colored black, can represent an asset not worked on as yet, the record for which can be flagged as Rdy=N 1440 and WIP=N 1442. A WIP record, whose background can be colored yellow, can be flagged as WIP=Y 1452. A Staged record, whose background can be colored green, can be reflected as staged Rdy=Y 1460.

Accordingly, it will be appreciated that there are many parameters associated with staging equipment for rental. By way of non-limiting examples staging parameters can comprise: time parameters such as those associated with time until a deadline such as customer pickup of an equipment asset; status parameters such as those associated with whether an equipment asset is in the process of being staged, is not being staged, or has completed being staged; condition parameters such as warnings or other messages related to maintenance, safety, changed conditions, errors, or other issues.

Figure 15:
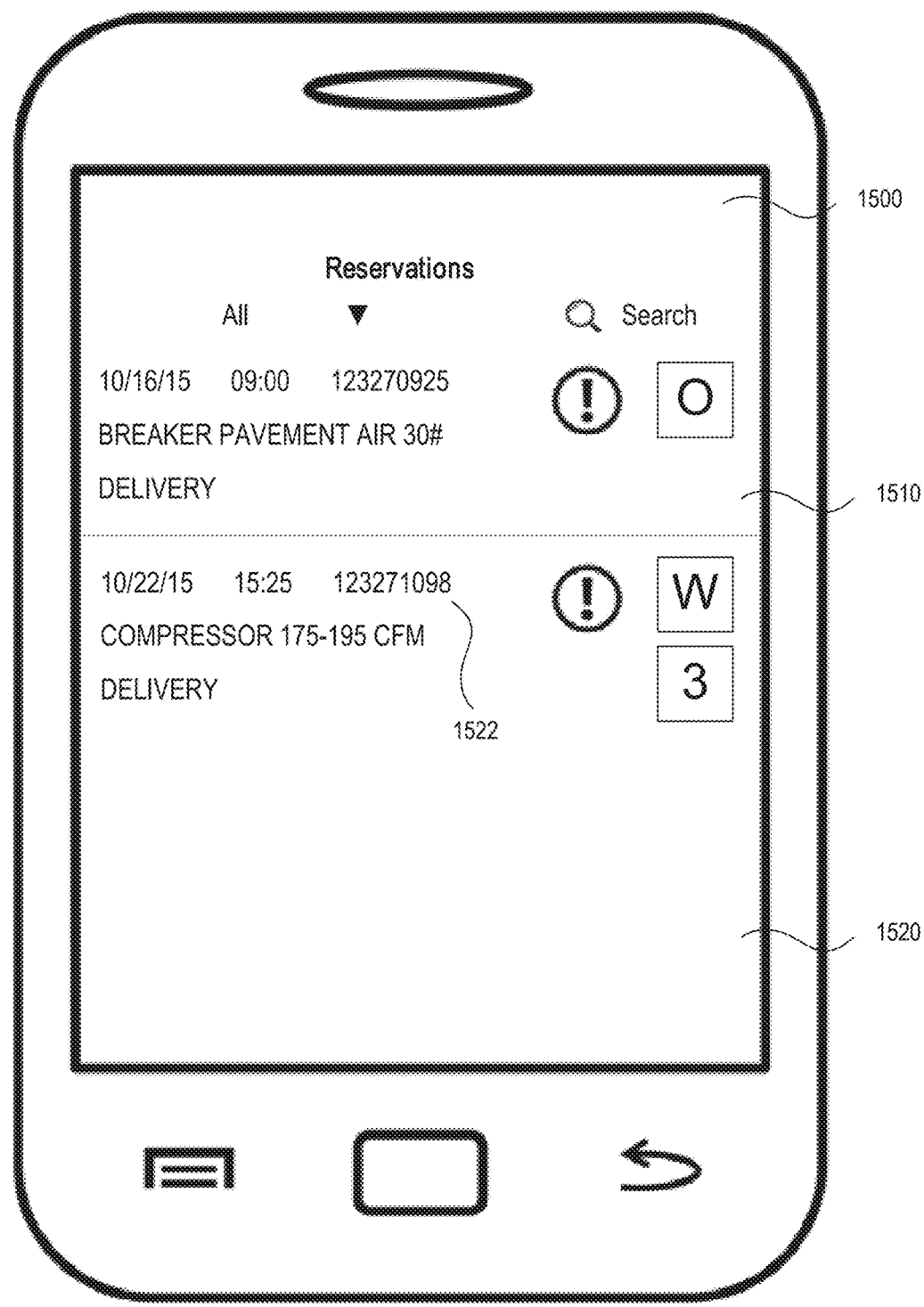
FIG. 15 illustrates one embodiment of a display on a mobile device reflecting a Reservations screen.
Figure 16:
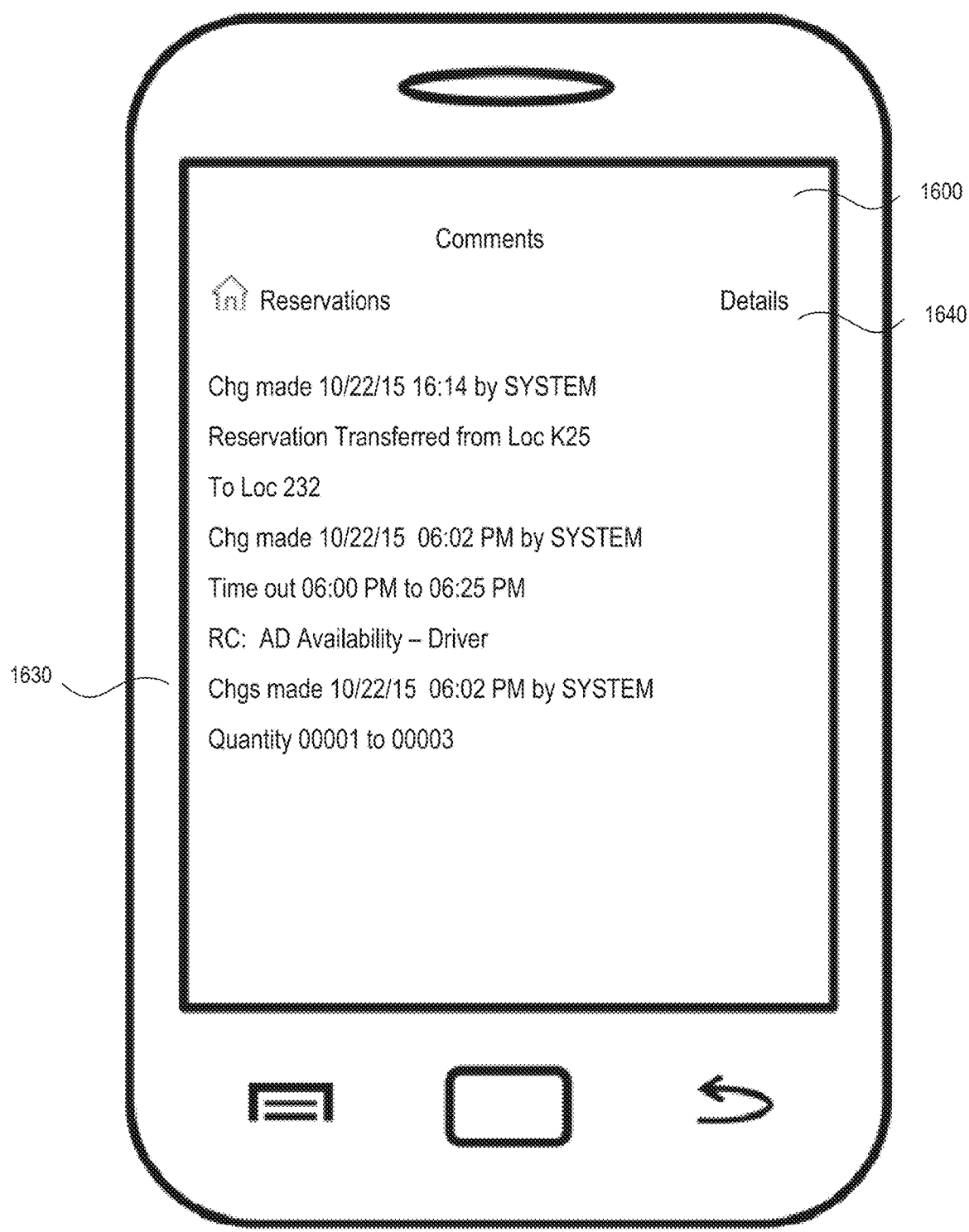
FIG. 16 illustrates one embodiment of a display on a mobile device reflecting a Comments screen.
Figure 17:
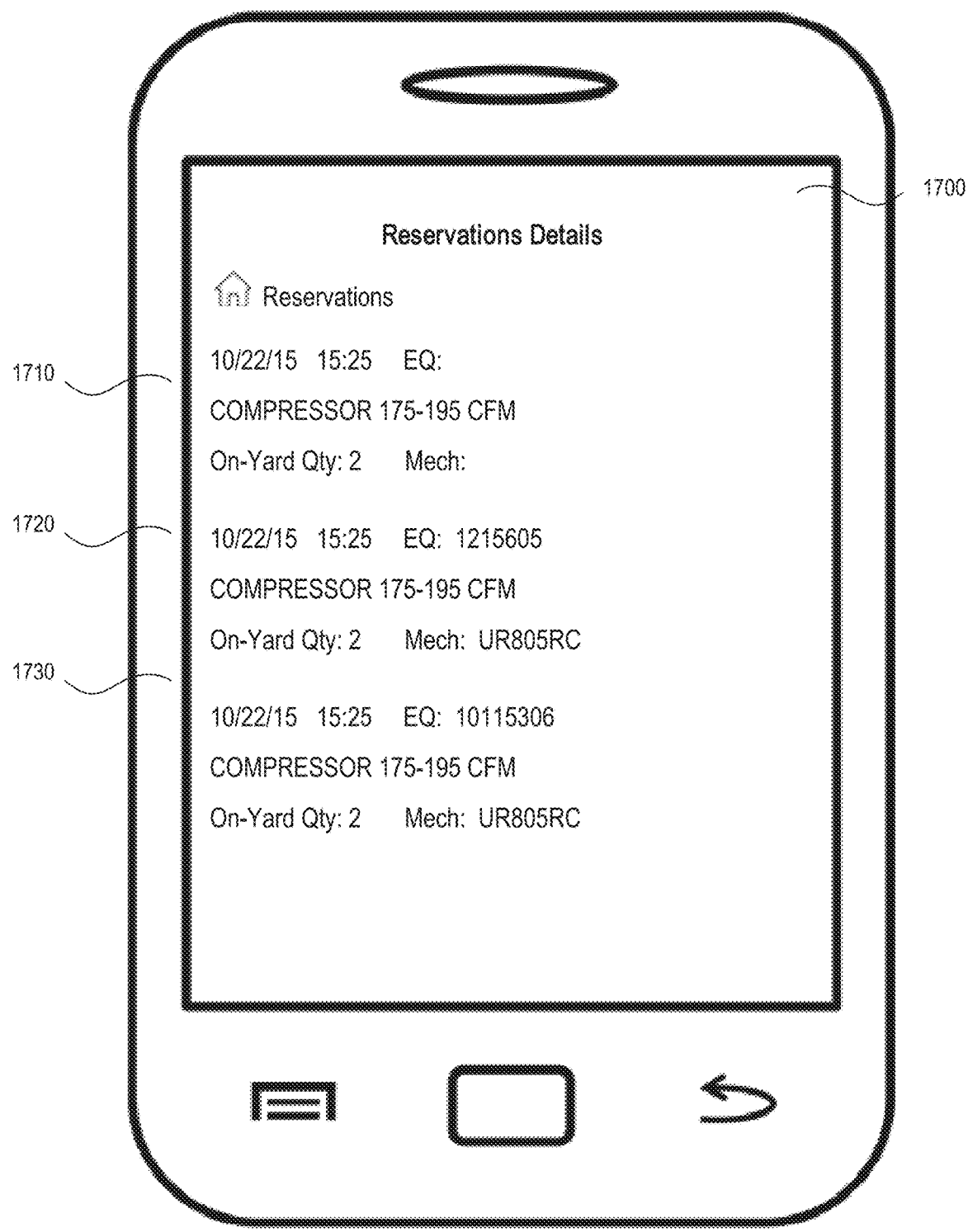
FIG. 17 illustrates one embodiment of a display on a mobile device reflecting a Reservations Details screen.

An example scenario is now given where an equipment associate, who can be an individual carrying out staging activities via a mobile app 180 or a GUI 195 in association with staging application 110, selects reservation 1520 represented in FIG. 15 (reservation number 123271098, seen at 1522). Because the reservation had Changes and/or Comments, a Comments window 1600 can be displayed before a Reservations Details screen 1700. Several changes 1610, 1620, 1630 can be shown, as reflected in FIG. 16. This screen can display all or some Changes/Comments. Selecting the Details button 1640 on Comments screen 1600 can launch Reservation Details screen 1700; this screen can display all single line assets to stage, here three compressors.

Figure 18:
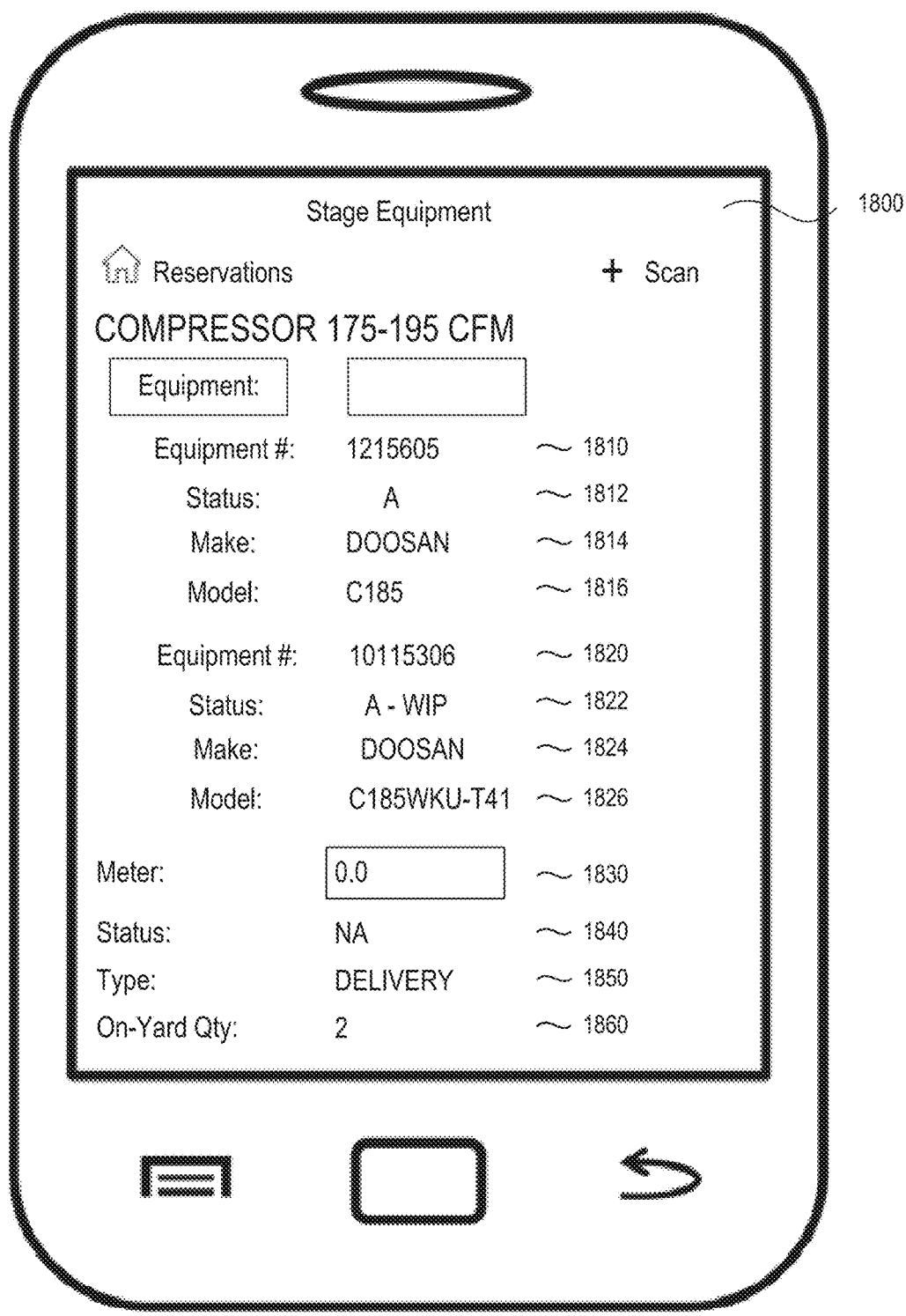
FIG. 18 illustrates one embodiment of a display on a mobile device reflecting a Stage Equipment screen.
Figure 19:
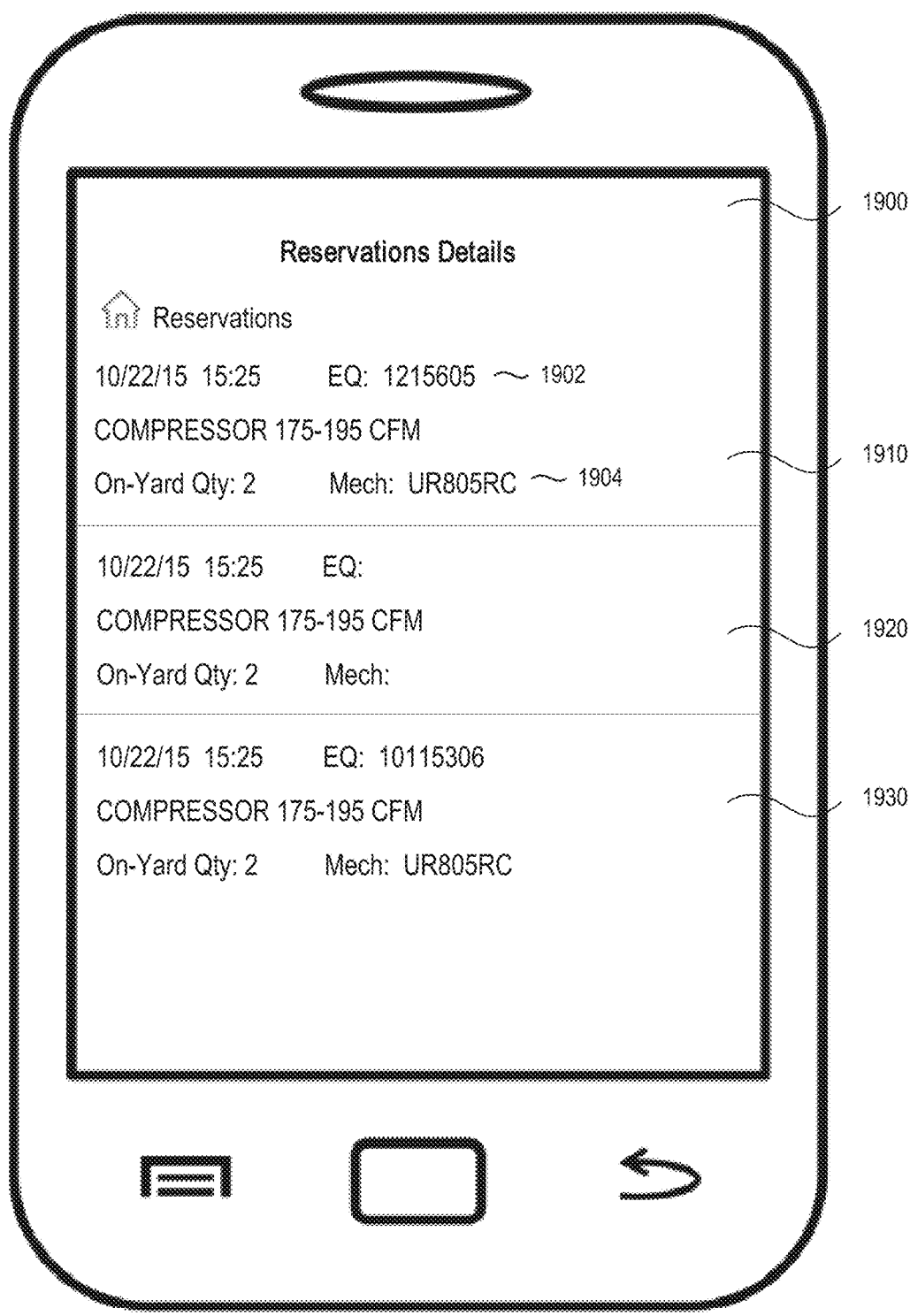
FIG. 19 illustrates one embodiment of a display on a mobile device reflecting a Reservations Details screen.

In another example scenario, an equipment associate can select the first staging record 1710, and can manually enter equipment number, scan the selected asset's barcode, or select the "Equipment" button which, as shown in FIG. 18, will display available assets (here two are shown corresponding to 1810 and 1820 and accompanying parameters thereof). Reservations Details screen 1900 as seen in FIG. 19 can show 1910 that equipment has been assigned 1902, a mechanic can be assigned 1904, and staging can be accomplished, with for example a green background.

Figure 20:
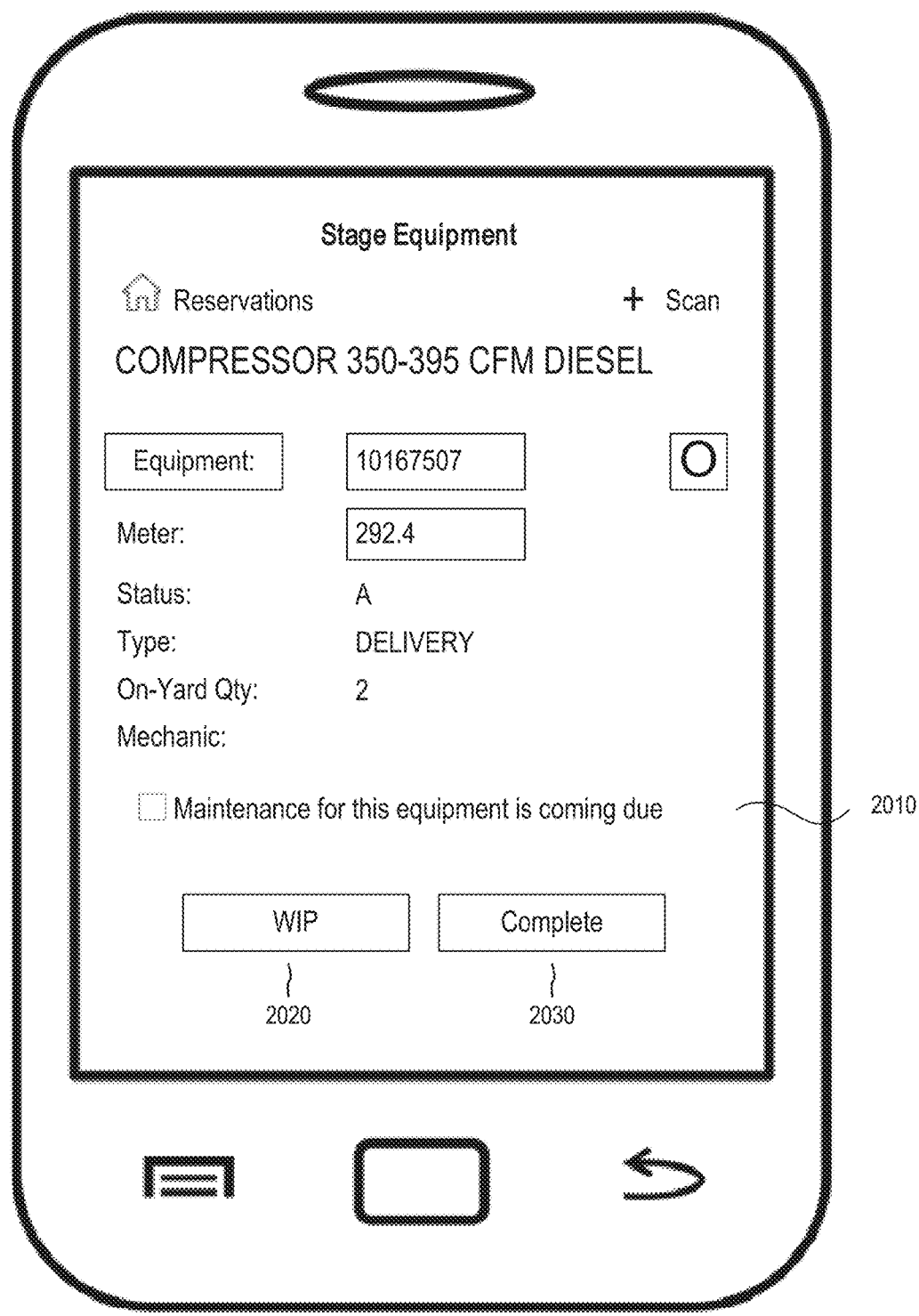
FIG. 20 illustrates one embodiment of a display on a mobile device reflecting a Stage Equipment screen.
Figure 21:
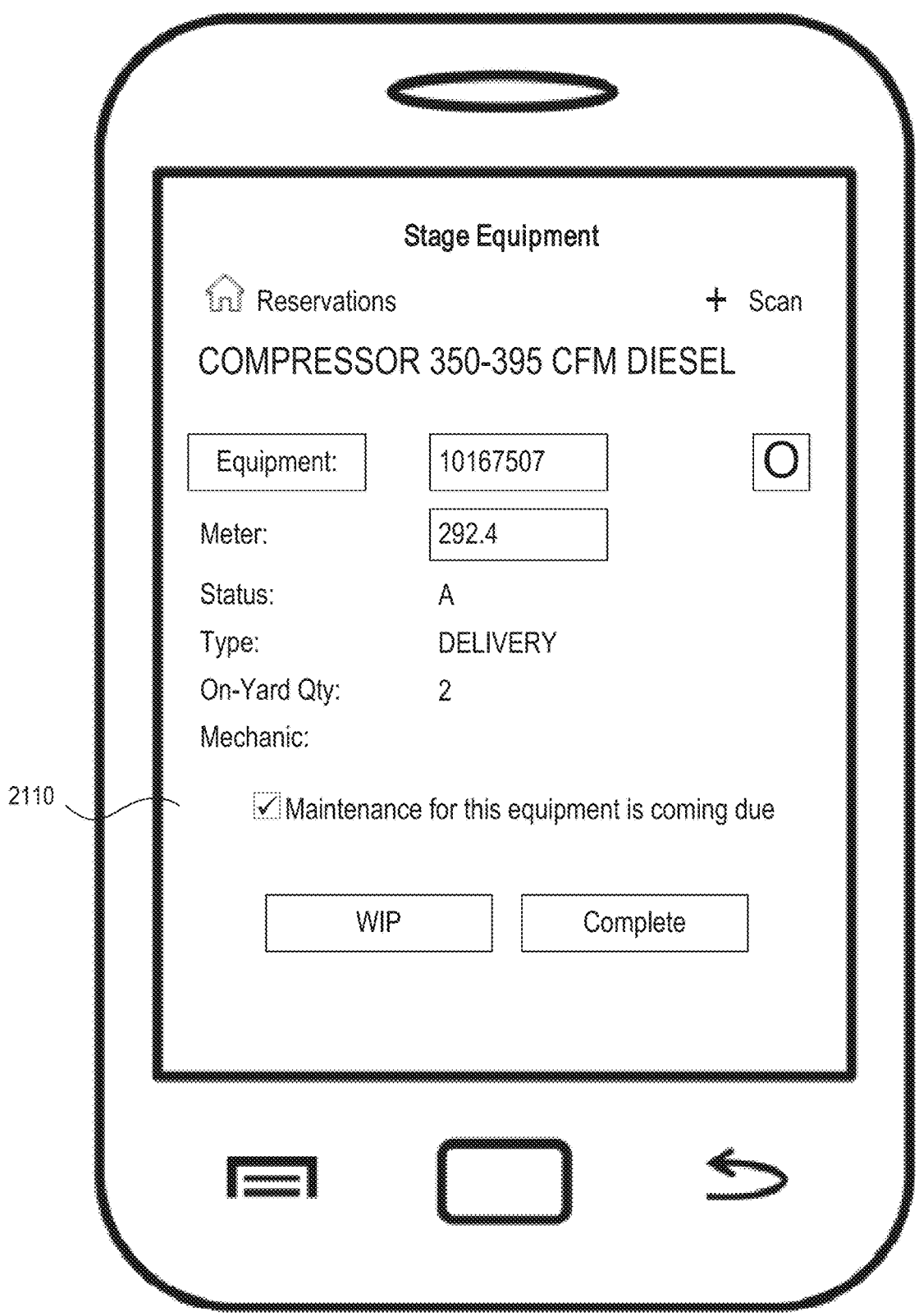
FIG. 21 illustrates one embodiment of a display on a mobile device reflecting a Stage Equipment screen.
Figure 22:
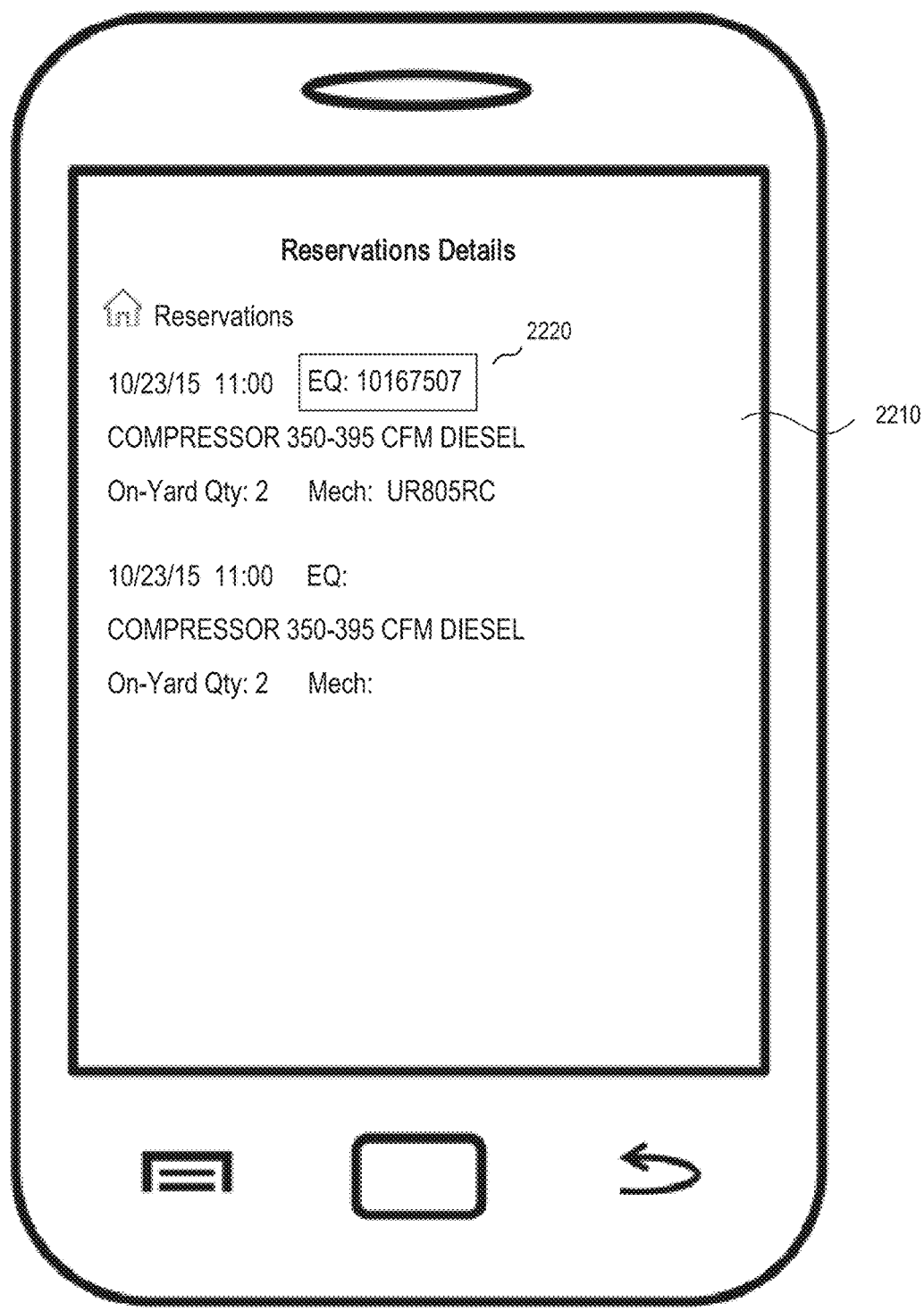
FIG. 22 illustrates one embodiment of a display on a mobile device reflecting a Reservations Details screen.

A warning message can be displayed if selected conditions, such as error conditions, are detected. As shown in FIG. 20, the mobile app can display a warning message 2010. Such warning message can be related to upcoming or overdue maintenance inspections. In embodiments, in order to continue with the staging process, before selecting a WIP 2020 or Complete 2030 button, as shown in FIG. 21 a user can acknowledge a message by checking a box 2110 associated with such warning message. If a user neglects to acknowledge the warning, as shown in FIG. 22, a visual/graphical cue can be displayed, e.g., a box 2220 (such as a red box), that indicates a warning status associated with a certain condition, and which can serve as a reminder.

Figure 23:
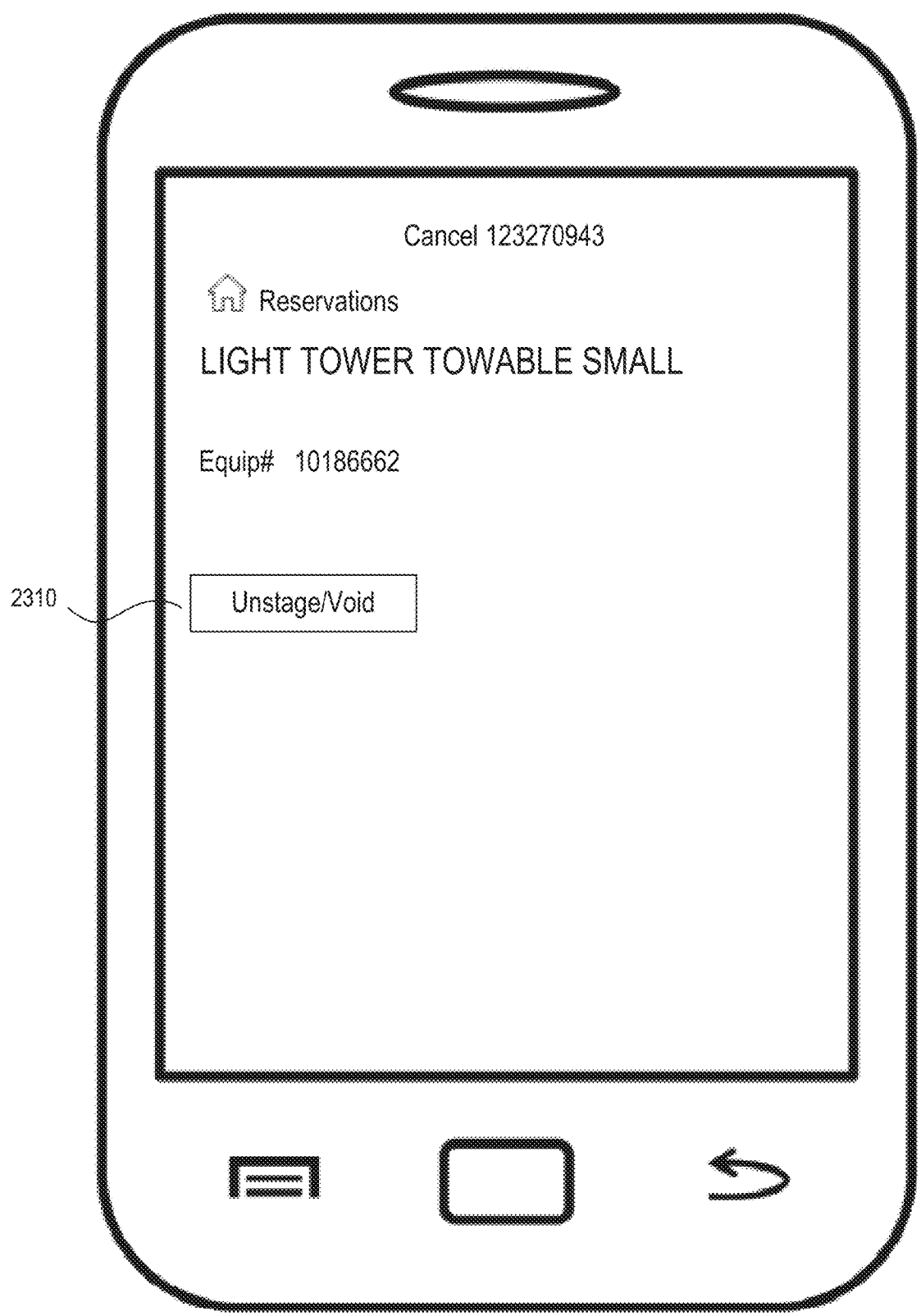
FIG. 23 illustrates one embodiment of a display on a mobile device that enables changing a reservation status.

FIG. 23 reflects an example display to unstage/void an equipment asset. When a record is in Changed status, the asset can be unstaged and put back into the Ready status. For example, a reservation may call for two staged light towers. An update to the reservation can result in changing the quantity from two to one. The quantity can be changed by interacting with staging application 110 or mobile app 180. As a result, as shown in FIG. 24, asset 2420 can be put in changed status. It can subsequently be put in ready status as seen in FIG. 25.

Figure 26:
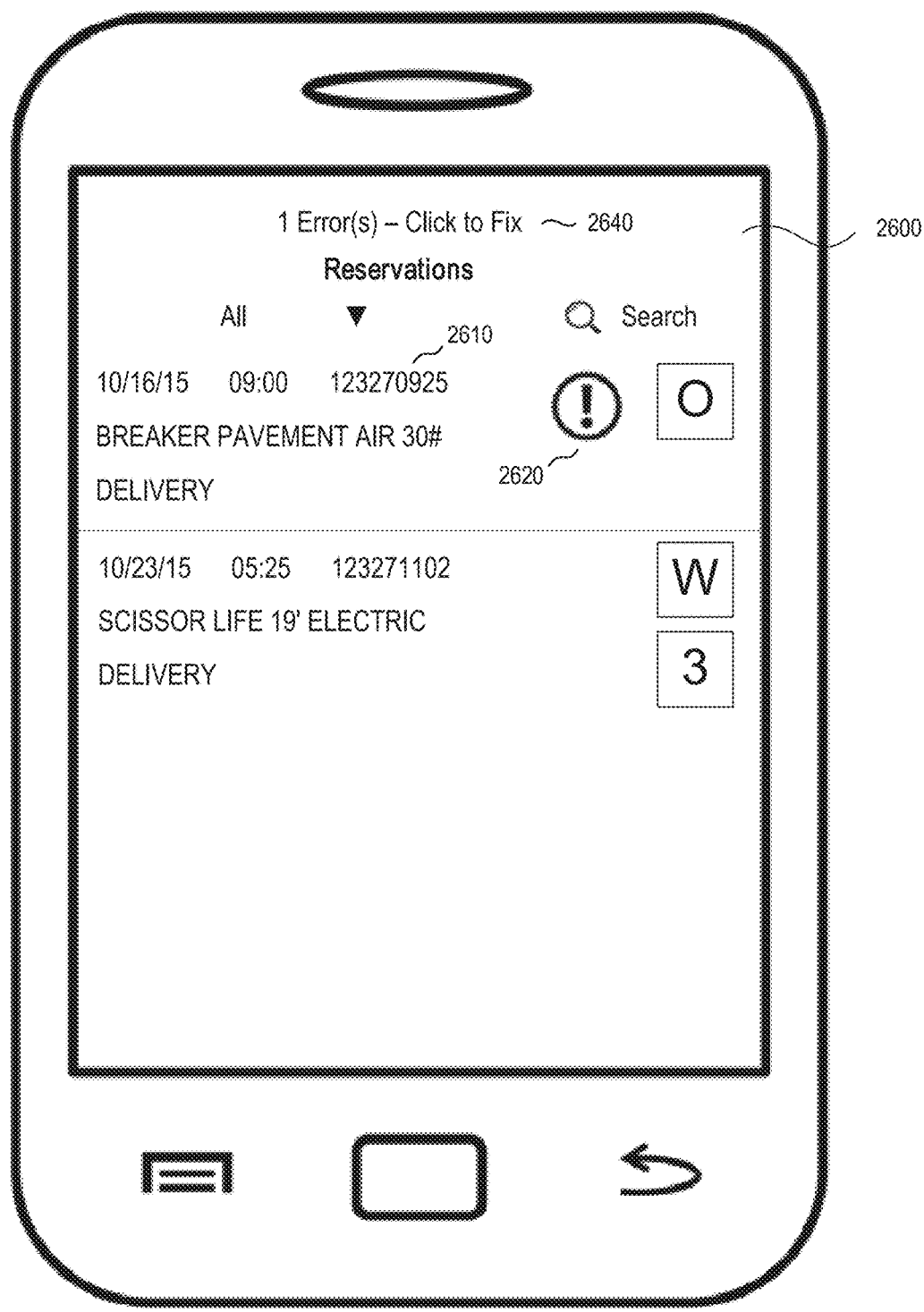
FIG. 26 illustrates one embodiment of a display on a mobile device in connection with an error condition.
Figure 27:
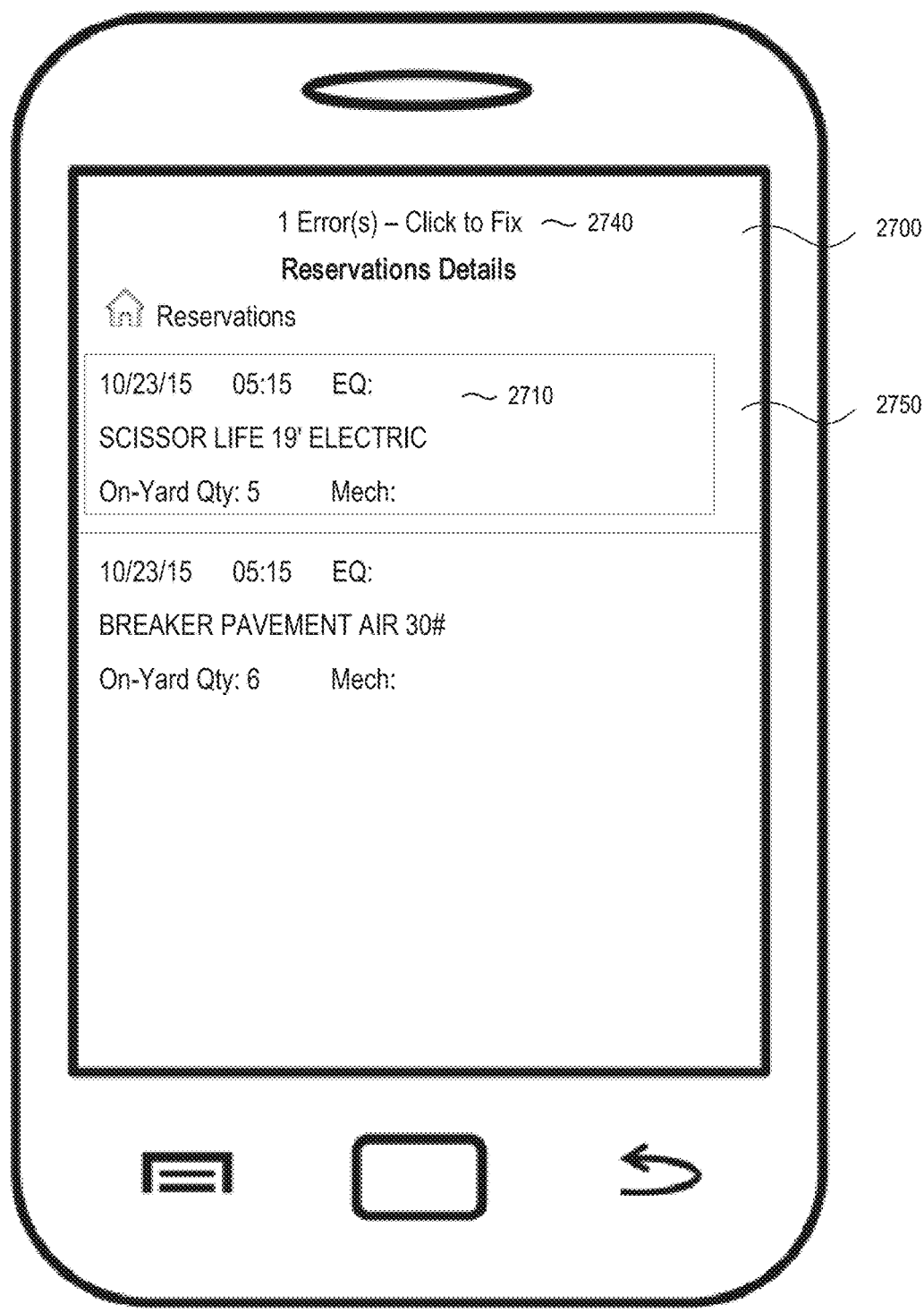
FIG. 27 illustrates one embodiment of a display on a mobile device in connection with an error condition.
Figure 28:
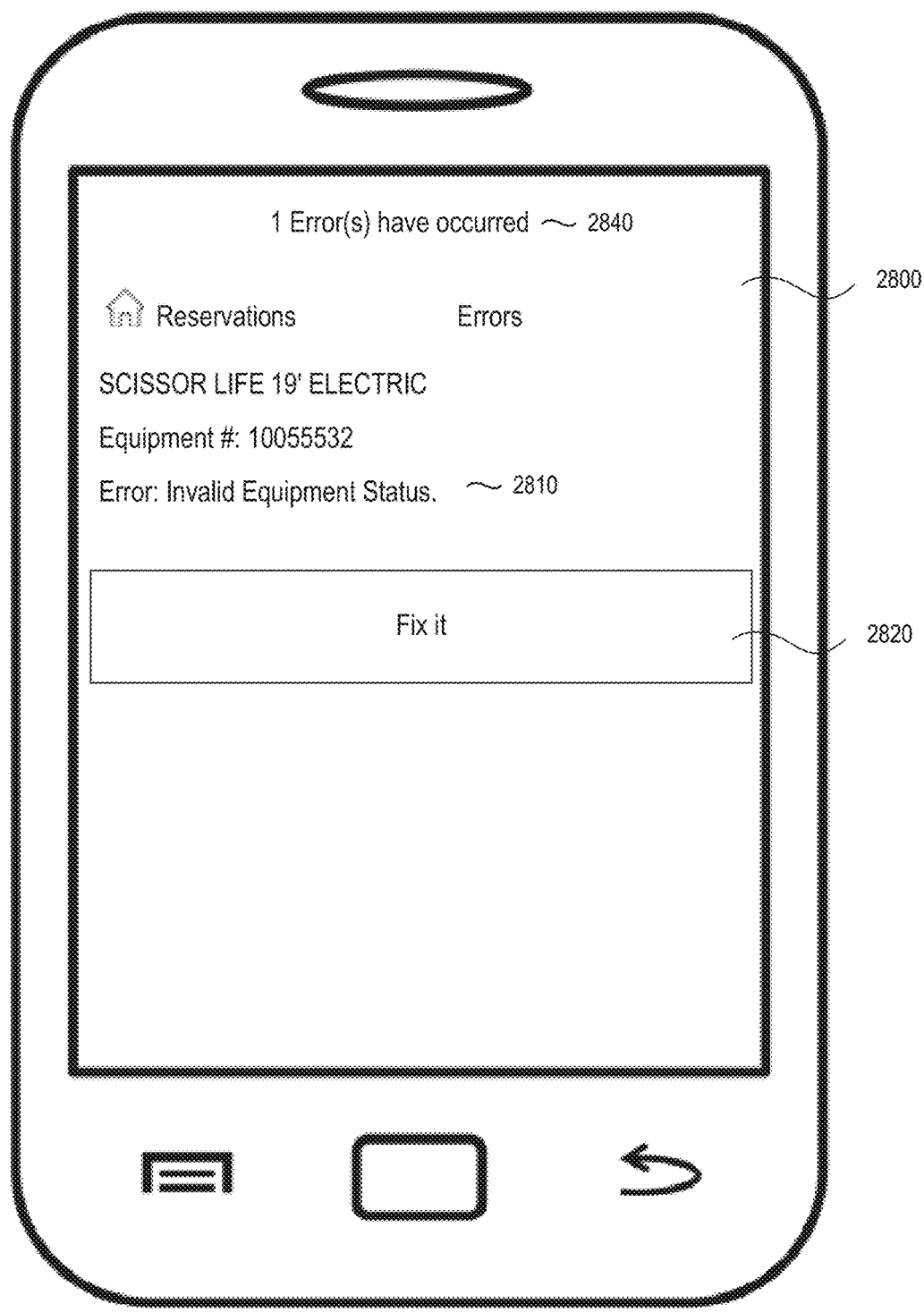
FIG. 28 illustrates one embodiment of a display on a mobile device in connection with rectifying an error condition.
Figure 29:
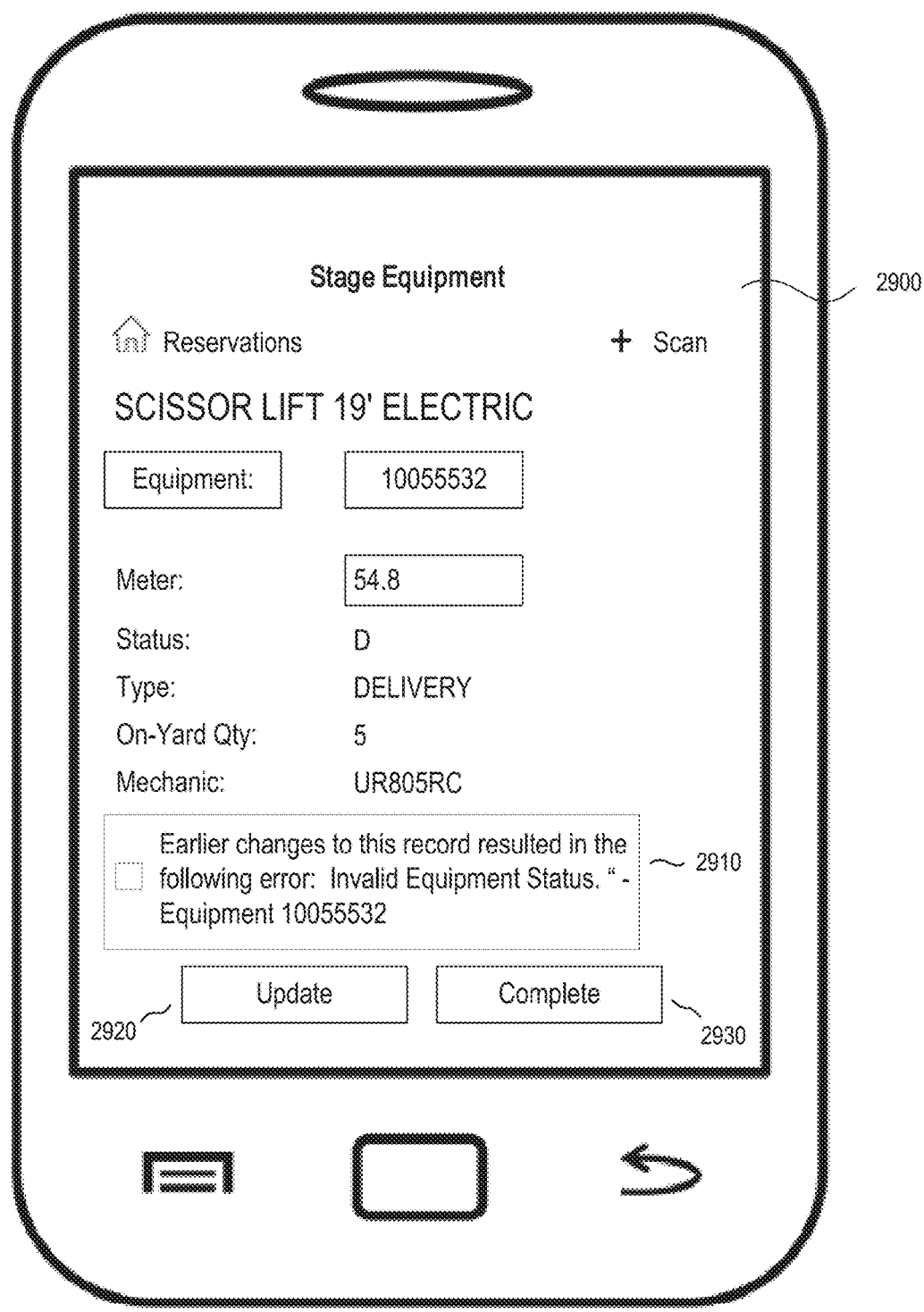
FIG. 29 illustrates one embodiment of a display on a mobile device reflecting a Stage Equipment screen mentioning an error condition.

Under circumstances, staging application 110 will return a staging error. If this occurs, the mobile app can display an Error banner 2640, 2740 which can be at the top of the Reservations and Reservations Details screens respectively, as shown in FIGS. 26 and 27. In addition, the affected reservation(s) can be highlighted as with a red border. For example, a user can attempt to stage an asset that has been updated by the service department, rendering the asset temporarily or permanently no longer rentable. In this case, the equipment number 2610 on Reservations screen 2600 can be omitted 2710 on Reservations Details screen 2700. Selecting the error banner 2840 or the highlighted record 2750 can lead the user to an Errors screen 2800. Selecting a Fix it bar 2820 can open a Stage Equipment screen 2900, as shown in FIG. 29, which can provide a cause of the error and the opportunity to rectify the error. Here, the error is given as an Invalid Equipment Status 2910. A method of correcting the error is for the equipment associate to acknowledge the error by entering a check mark in conjunction with the error message 2910. The equipment associate can select an Update button 2920 which can put the record into WIP status without an asset. Another method is for the user to stage a different asset by entering, scanning or selecting a different equipment number and selecting Complete button 2930. Both processes can remove the error banner 2840 and red border highlights.

Figure 30:
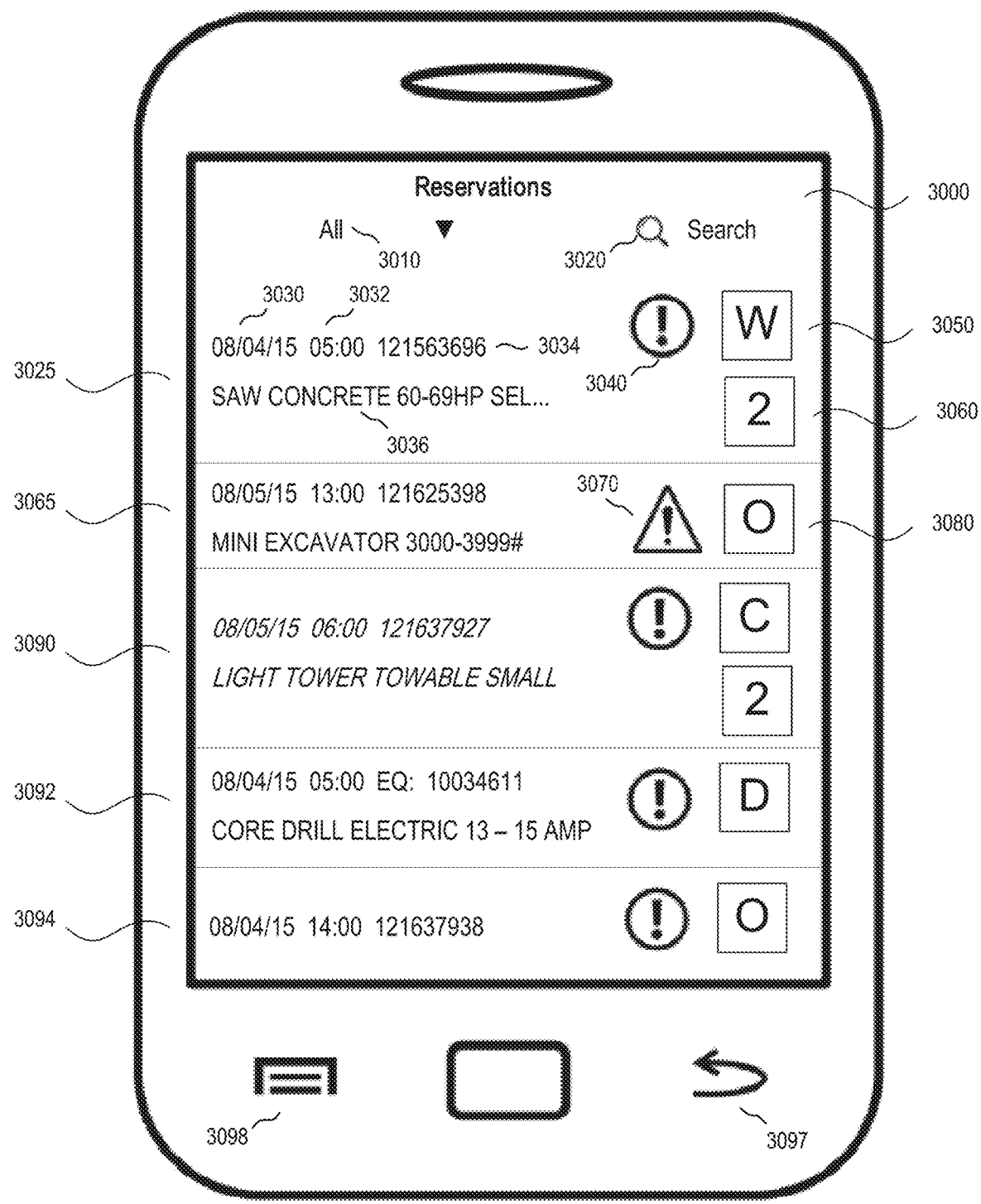
FIG. 30 illustrates one embodiment of a display on a mobile device reflecting a plurality of graphical user interface features and visual elements.

Further description of example interface features for selected screens will be now be provided. Stage screens can include a Reservations screen, Comments screen, Reservations Details screen, and a Stage Reservation screen, among others; an example Reservations Screen is depicted in FIG. 30. On a Reservations screen 3000 that has five sample reservations 3025, 3065, 3090, 3092, 3094 a reservation filter 3010 can include all types, such as delivery only, or non-delivery only, the latter two appearing on a dropdown menu next with associated radio buttons that can be checked or unchecked. A reservation search 3020 field can be provided. Number of assets to be staged for the reservation 3060 can be provided. Urgency flags 3040, 3070 can be provided that indicate proximity to a given staging deadline. An exclamation point in red circle 3040 can indicate that staging is overdue, and an exclamation point in a yellow triangle can indicate that staging is due in 30 minutes or less. Different time periods can be used besides 30 minutes, which can embrace similar or different staging processes, dynamics and results, as desired. Multiple time periods can be used, i.e., one-hour until deadline, 30 minutes until deadline, 15 minutes until deadline, and can be used singly or in combination of one, some or all. Reservation statuses can be provided. O can indicate Open (staging not started); W can indicate WIP (Work in Progress), D can indicate Done (staging completed); C can indicate Changed (a changed record). In addition, a records highlight color can indicate staging status. Black can indicate Open, Yellow staging in process, Green staging complete, and Red a changed record. A Back button 3097 can bring the user back to the prior screen. A Menu button 3098 can provide a menu of options.

Figure 31:
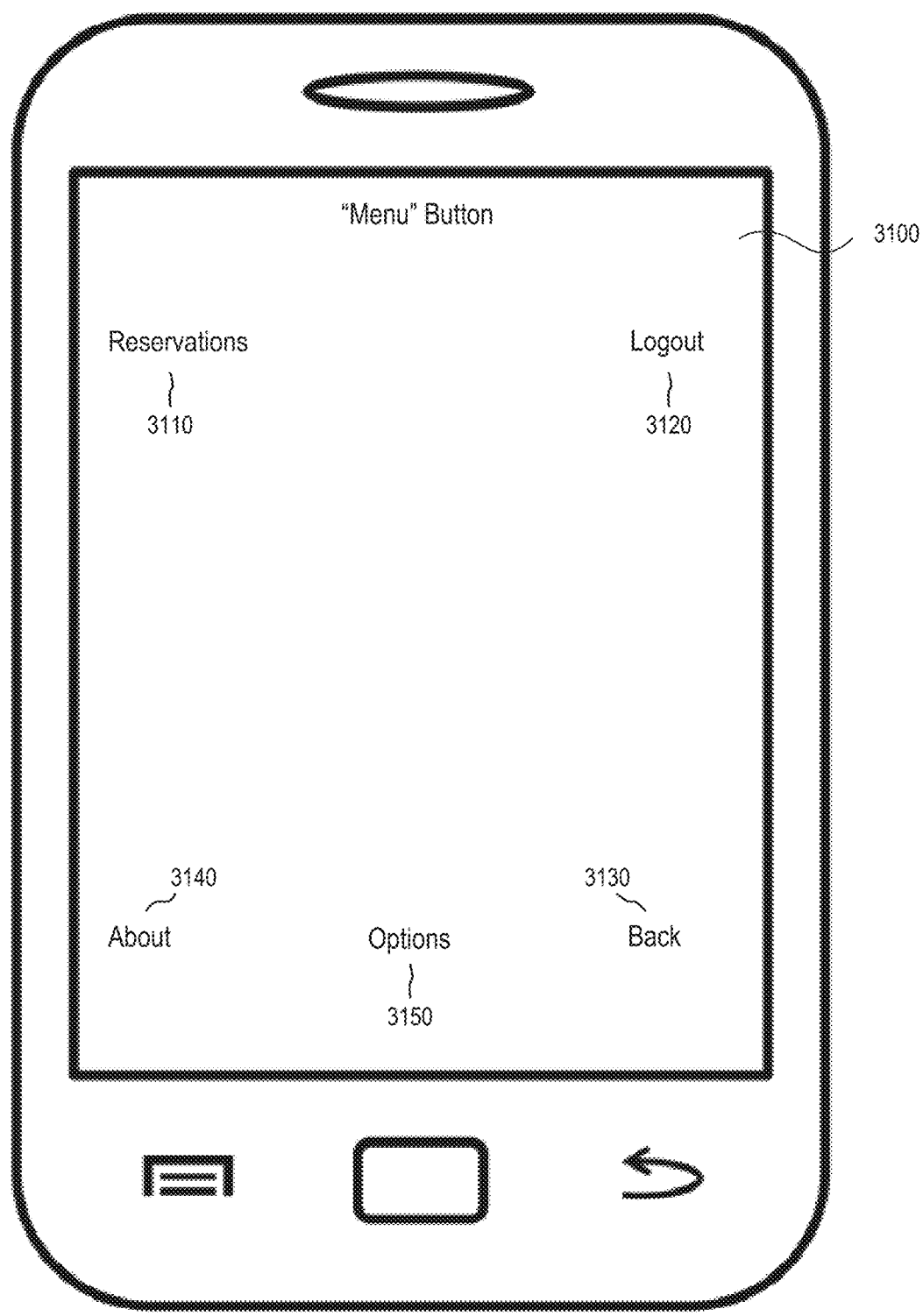
FIG. 31 illustrates one embodiment of a display on a mobile device that can serve a Menu function.

A screen displayed based on activating the Menu button 3098 is shown at FIG. 31. Reservations 3110 can lead to navigation to the Reservations screen. Logout 3120 can logout the user from the app and present a Login screen. Back 3130 can go back to a prior screen. About 3140 can display the software version of the mobile app, branch location, and a telephone number to call for support. Options 3150 can assist with contacting Helpdesk personnel, or it can also lead to numerous options that can be used in association with mobile app 180.

Figure 32:
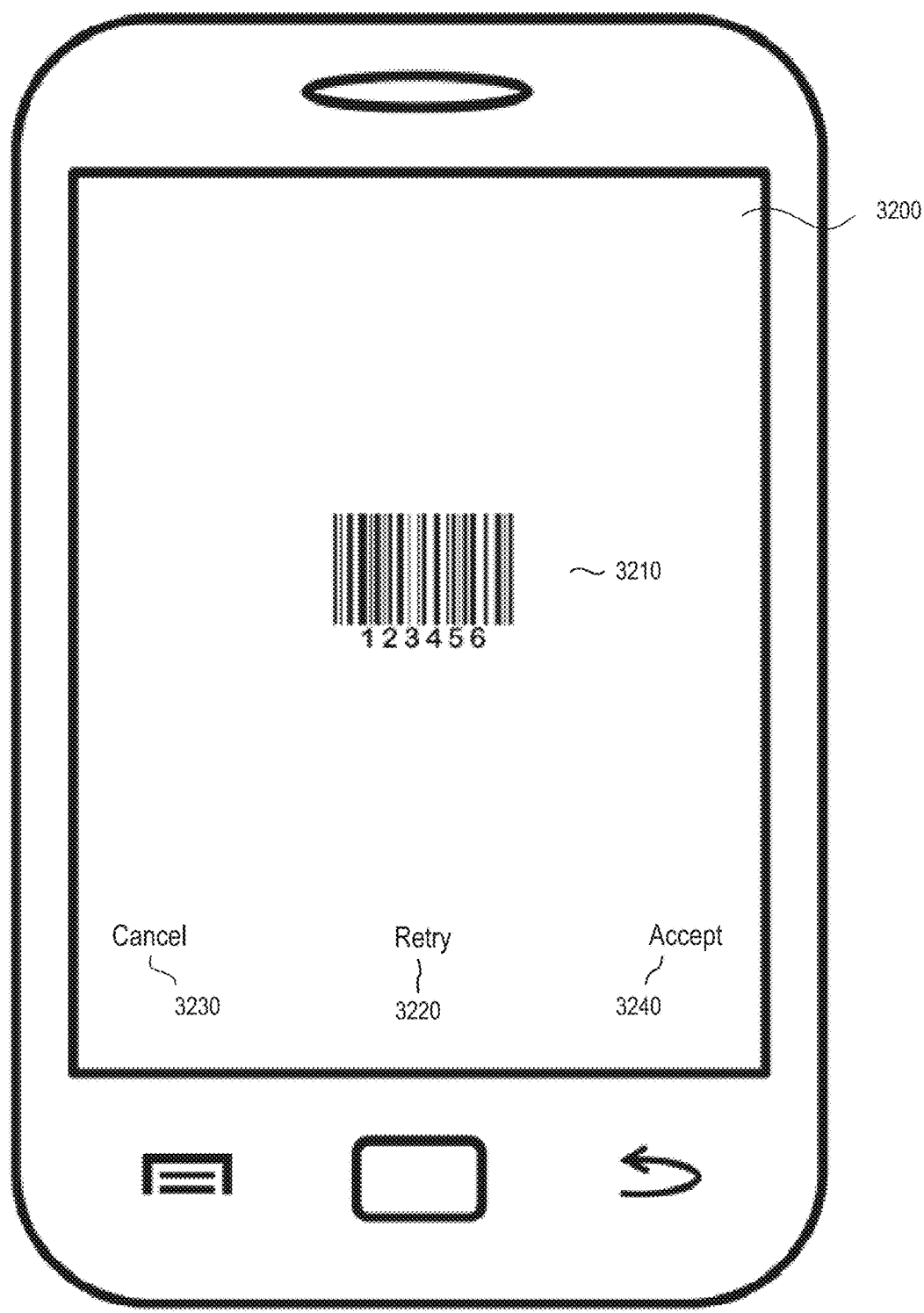
FIG. 32 illustrates one embodiment of a display on a mobile device that can be used in connection with scanning a barcode.

Scanning can be performed. As shown in FIG. 32, scanning functionality can be employed that can obtain a barcode. A barcode can be located on an equipment asset, on a document to convey information or enable communication, and other locations.

Thus, in embodiments information about the status and location of reserved equipment is made available to an equipment associate working in the facility. Upcoming reservations can be prioritized and updated in real time with communication via a wireless handheld device. Presence of specific customer requirements can force a read and confirm step. The status of reservations can be color-coded, with reservation changes creating an update communicated in real time with a message and change in status/color on mobile device 170. Equipment can be selected to fill a reservation by the equipment associate, who can make a determination based on physical accessibility, maintenance requirements (available on proposed assignment), and other factors.

Any outstanding maintenance requirements can be communicated as an alert at the time of equipment selected, reducing potential for re-work. Attachments and configurations can be communicated at time of selection and confirmed prior to a move to a staging error, reducing potential for error. Most or all accessible equipment within the category class can be selected, reducing work to maneuver other equipment out of the way or take a circuitous route.

Selected equipment can be moved to a staging area, with equipment level (vs. job level) update of new position communicated when it reaches the staging area. Any changes to the reservation can be communicated at the equipment level via a color-coded real-time update. Dispatch—i.e., an individual(s) assisting in facilitating the systems and methods herein, including those in communication with a driver/customer or facility personnel—can have visibility into the percentage completion of each staging job and can better anticipate completion time. An equipment associate can have completed jobs "archived" and can focus attention on prioritized jobs in a queue. Multiple physical trips to a terminal, such as but not limited to one in association with staging application 110, can be mitigated, with better transparency of information communicated/coordinated across multiple systems. Equipment for loading can be staged, e.g., eliminating driver need to move out of a loading area to search for a forklift.

A fully staged job can be communicated to dispatch in real time. Dispatch can contract the equipment and assign a driver, often before the driver returns to the facility. A driver can pull in directly to an assigned loading area and begin loading. A driver can remove a step of checking a manifest, as confirmation against a latest spec already exists. Other team members outside of the equipment associate can have sufficient visibility to know where they can help if an equipment associate is at full capacity.

Accordingly, equipment and status at a branch can be uploaded into the mobile device 170. Reservation and staging data can be transferred from staging application 110. Upcoming reservations listed by time on the mobile device can be color-coded by staging status. Time can be blocked off in 3 hour windows. Reserved equipment by category class can be handled with notes in the comments. Notification and color change can be made to changes to staged reservations. Order comments or reservation notes can pop up and force the user to scroll through and acknowledge.

Stageable equipment can be selected. Equipment information can be captured, and meter data noted, by scanning or entering manually. Alerts can be made if any maintenance is due. An item can be marked in connection with WIP by actuating a field or pushing a button. Attachments can be added, and configurations provided. Category class can be confirmed. Equipment can be staged and status updated until the reservation is completed.

Completed staging can create notification for dispatch. Visual elements can be employed; for example GUI functionality in association with mobile app 180 or staging application 110 can add visual elements to convey information (e.g., new task), and can remove visual elements (e.g., task completed). Dispatch can establish a "contract" based on the reservation prior to the arrival of a driver (who can be acting on behalf of a customer, or be the customer) at the equipment facility or a specified staging area in the equipment facility. Information/instructions can be transmitted to a device in control of the driver.

It will be appreciated that a single visual element will have significance and enable proper decisions and actions to be taken. In addition, a combination of visual elements can enhance the ability to make decisions and take actions. There can be synergy by which a first visual element can add value, and a second visual element can add value, and the combination of visual elements on the display can add further and synergistic value. By way of non-limiting example, a first visual element can convey that there an equipment asset, or task, has been identified. However, it may not immediately clear from the identification of the asset or task what the priority is, how close a deadline may be, whether there are comments that can be usefully displayed on the screen, special needs for the customer, maintenance issues (perhaps maintenance is considered overdue), safety issues or many other statuses and/or conditions. Each visual element alone can be helpful; combining two, or more, visual elements can provide further context, reveal significance of each, and enable individuals to make intelligent, cost-effective, safe, decisions with customer-service advantages as well as enable operating a profitable equipment rental facility.

Figure 33:
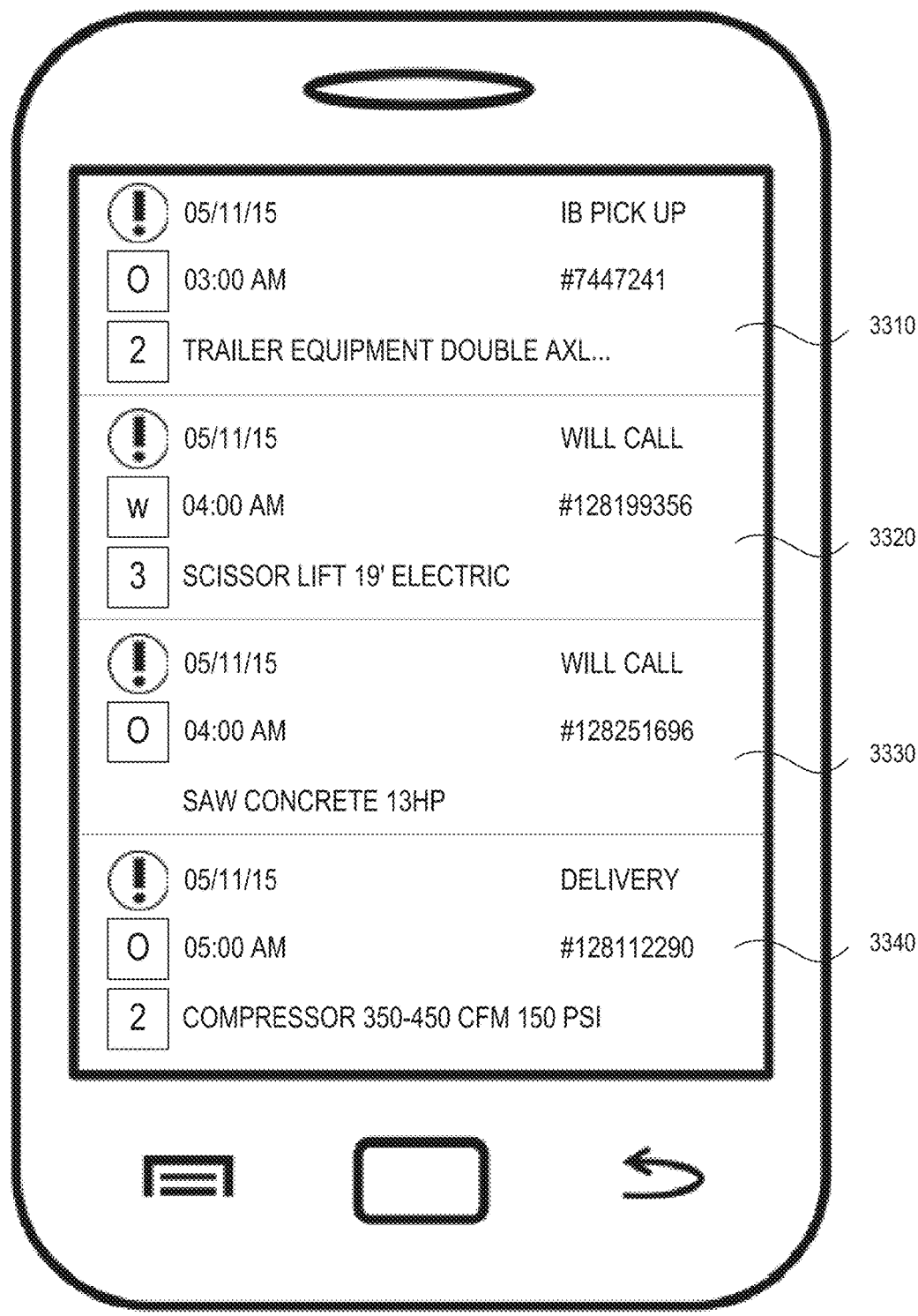
FIG. 33 illustrates one embodiment of a display on a mobile device in connection with reservations and operations related thereto.

FIG. 33 illustrates one embodiment of a display on a mobile device in connection with reservations and operations related thereto. Background colors can be assigned to correspond with status. For example, the rectangular portion extending from one side of the screen to another in which an item with WIP status is seen can be associated with a yellow color 3320. Items in an Open status can be associated with a black color 3310, 3330, 3340. (For purposes of illustration in the Figures, the text herein is black against a white background; however, the color scheme can well be reversed in practice: i.e., for certain matters in Open status, text appearing in black in this figure and other figures against a white background can, rather, be implemented in practice as text in a lighter color against a black background, or a white color against a black background. This can be the case here and in embodiments in other instances where an Open status is given.

Figure 34:
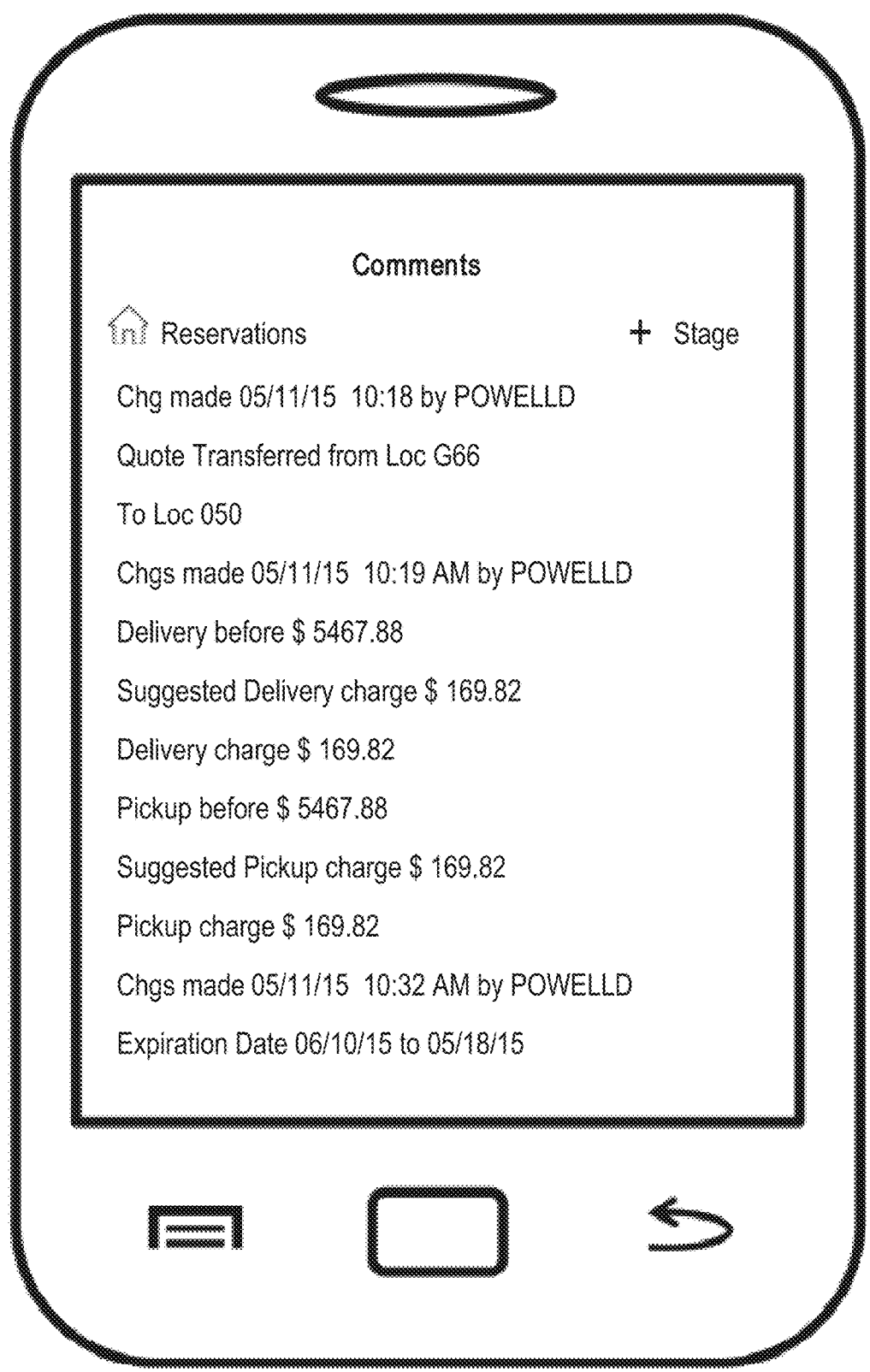
FIG. 34 illustrates one embodiment of a display on a mobile device in connection with a comments screen and operations related thereto.

FIG. 34 illustrates one embodiment of a display on a mobile device in connection with a comments screen and operations related thereto.

Figure 35:
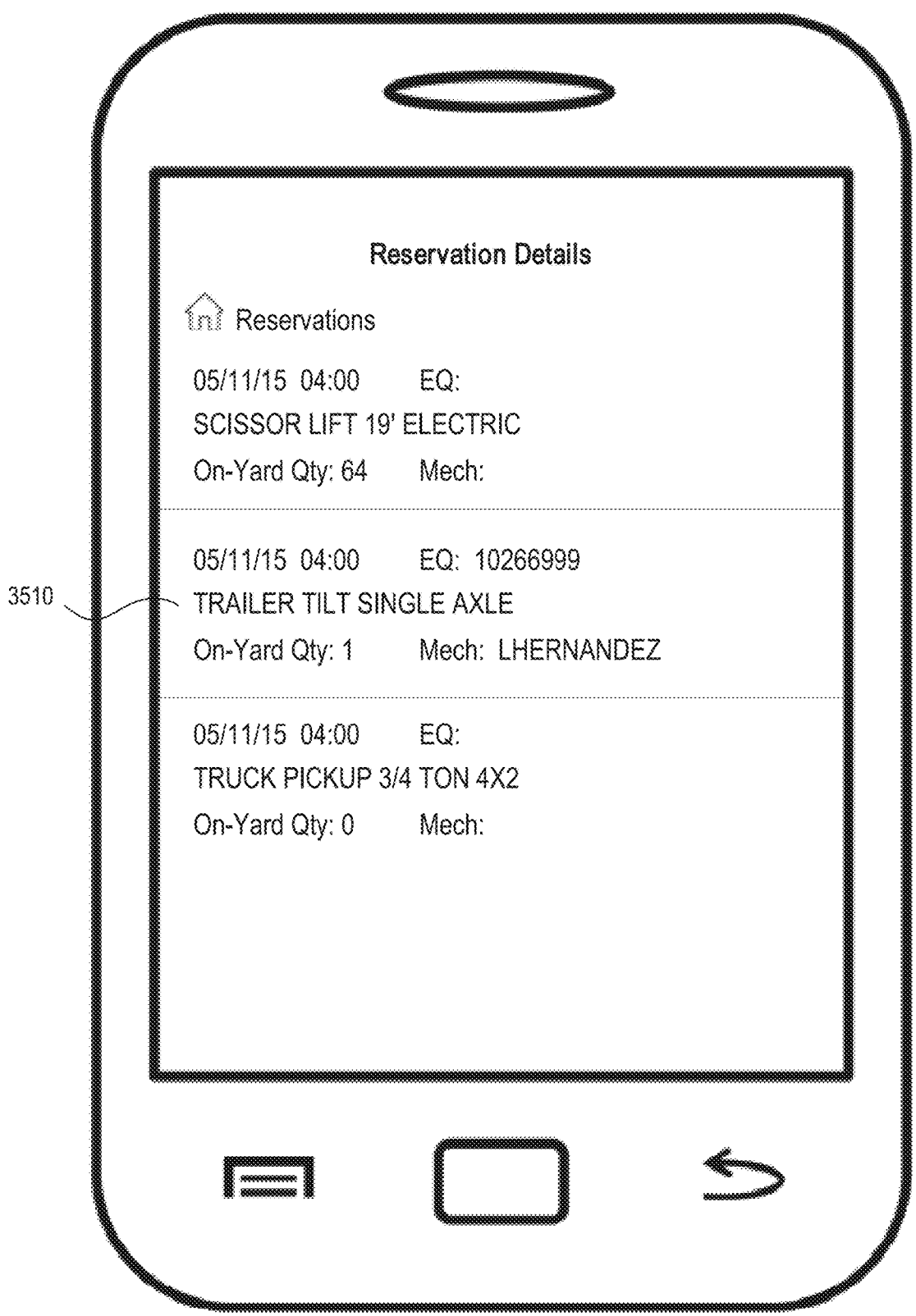
FIG. 35 illustrates one embodiment of a display on a mobile device in connection with reservation details and operations related thereto.

FIG. 35 illustrates one embodiment of a display on a mobile device in connection with reservation details and operations related thereto. Again, item 3510 can be black text against a yellow background.

Figure 36:
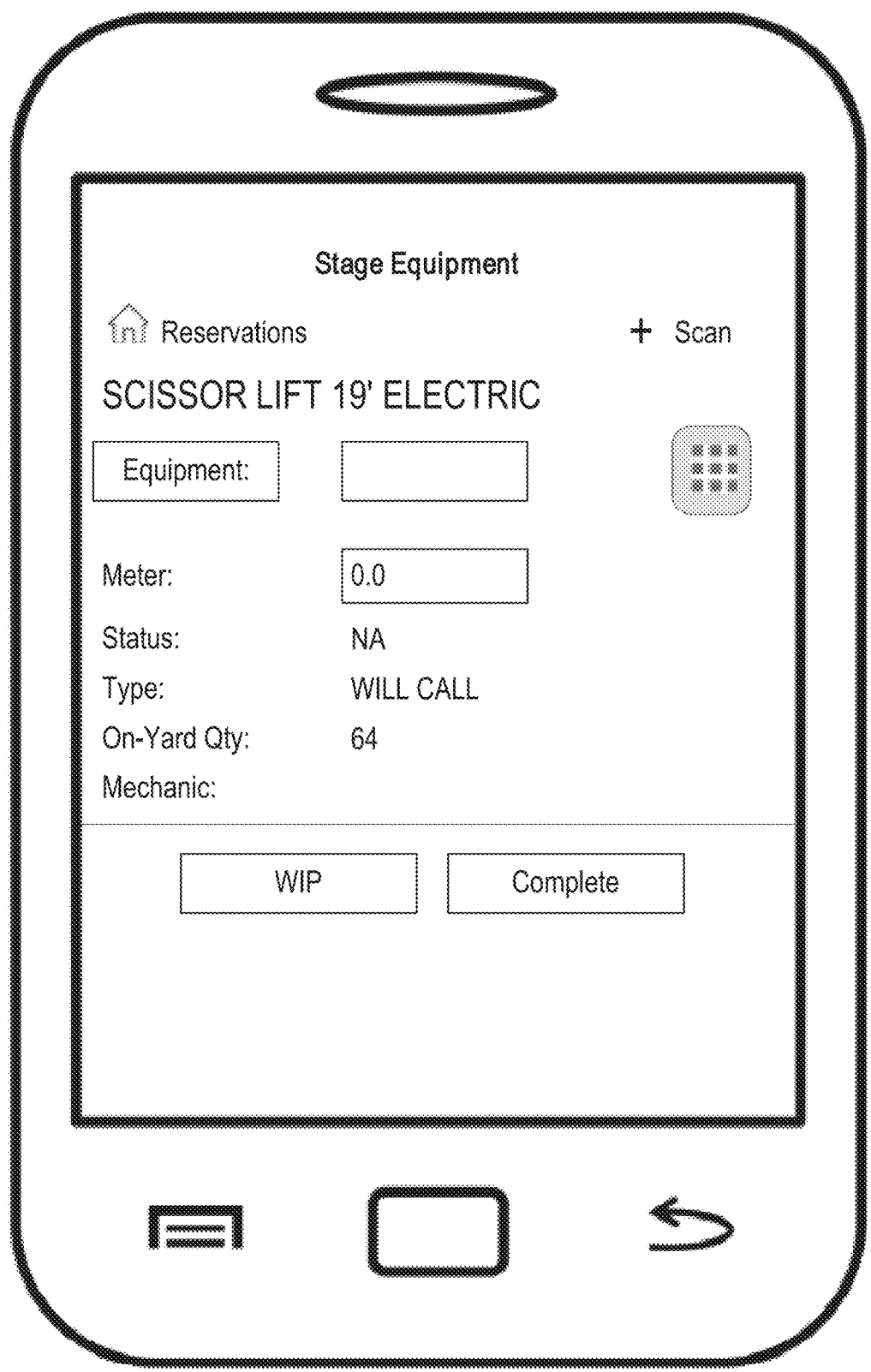
FIG. 36 illustrates one embodiment of a display on a mobile device in connection with a stage equipment screen and operations related thereto.

FIG. 36 illustrates one embodiment of a display on a mobile device in connection with a stage equipment screen and operations related thereto.

Figure 37:
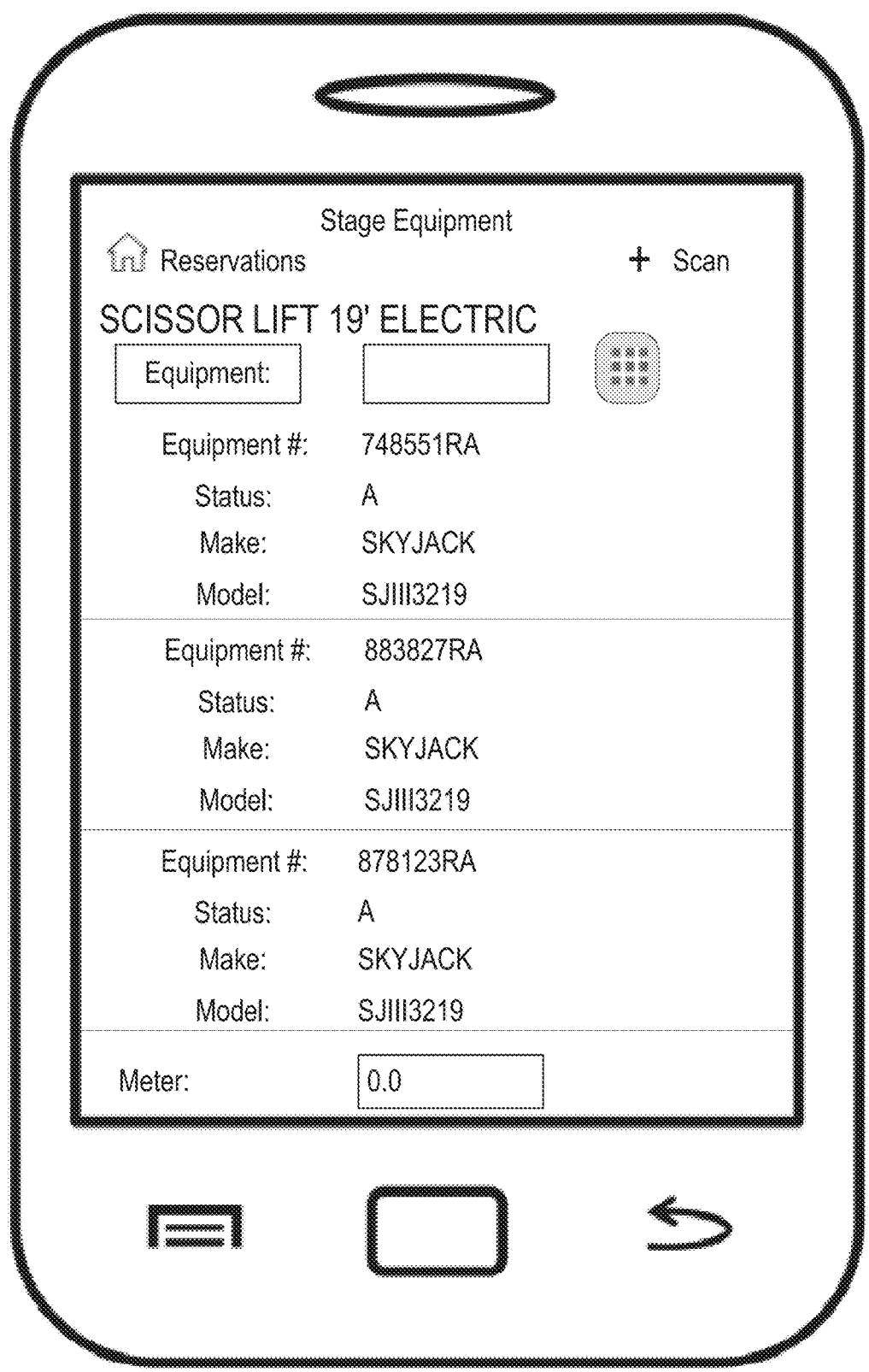
FIG. 37 illustrates one embodiment of a display on a mobile device in connection with a stage equipment screen and operations related thereto.

FIG. 37 illustrates one embodiment of a display on a mobile device in connection with a stage equipment screen and operations related thereto. In embodiments, equipment can be listed in order of equipment that has experienced the longest period of not being rented, or based on other statuses. If an equipment asset is listed first, because, compared to other equipment assets it has not been rented longest, and that first equipment asset is selected, there can be advantages, including enhancing overall equipment longevity.

Figure 38:
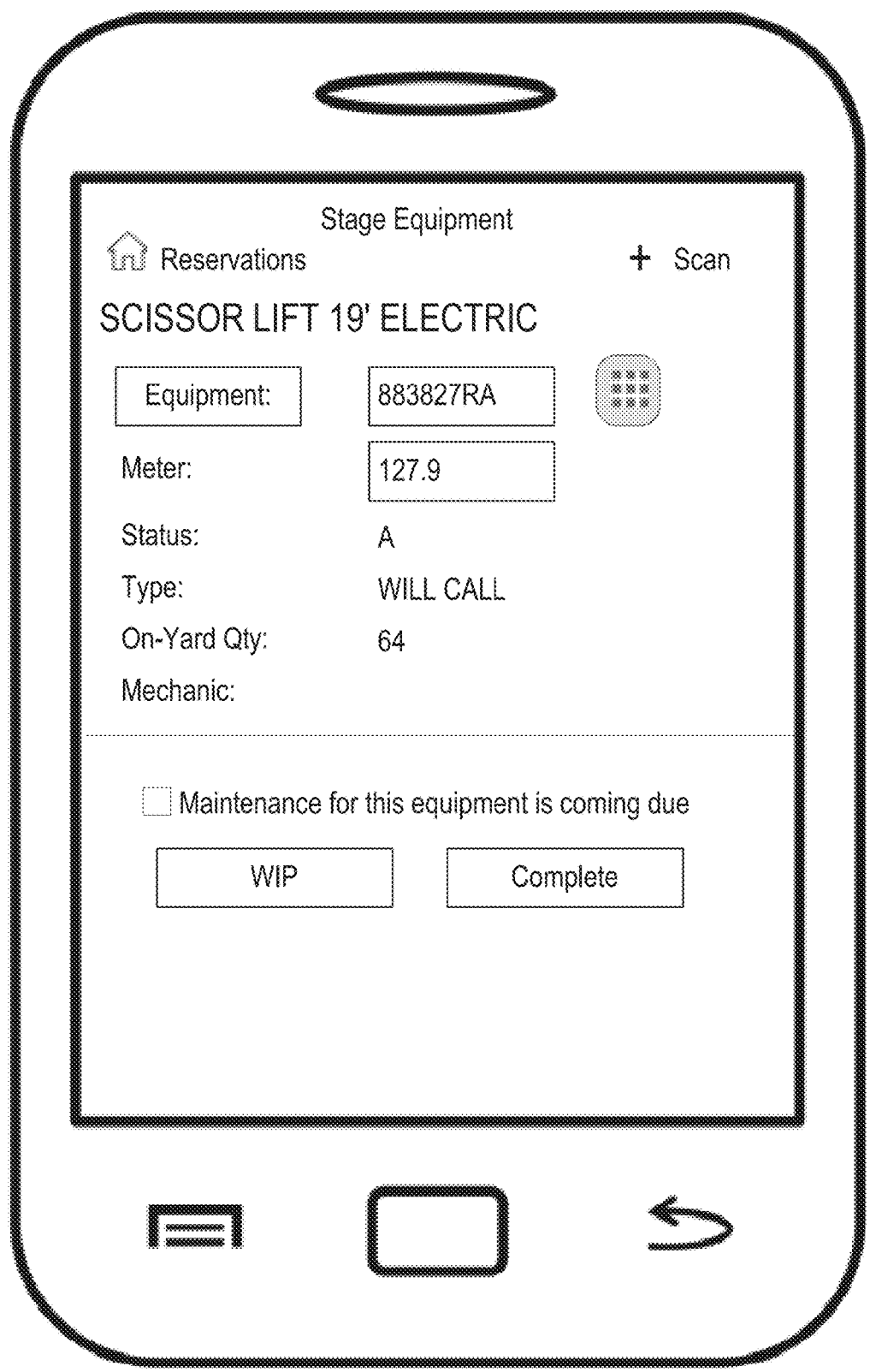
FIG. 38 illustrates one embodiment of a display on a mobile device in connection with a stage equipment screen and operations related thereto.

FIG. 38 illustrates one embodiment of a display on a mobile device in connection with a stage equipment screen and operations related thereto.

Figure 39:
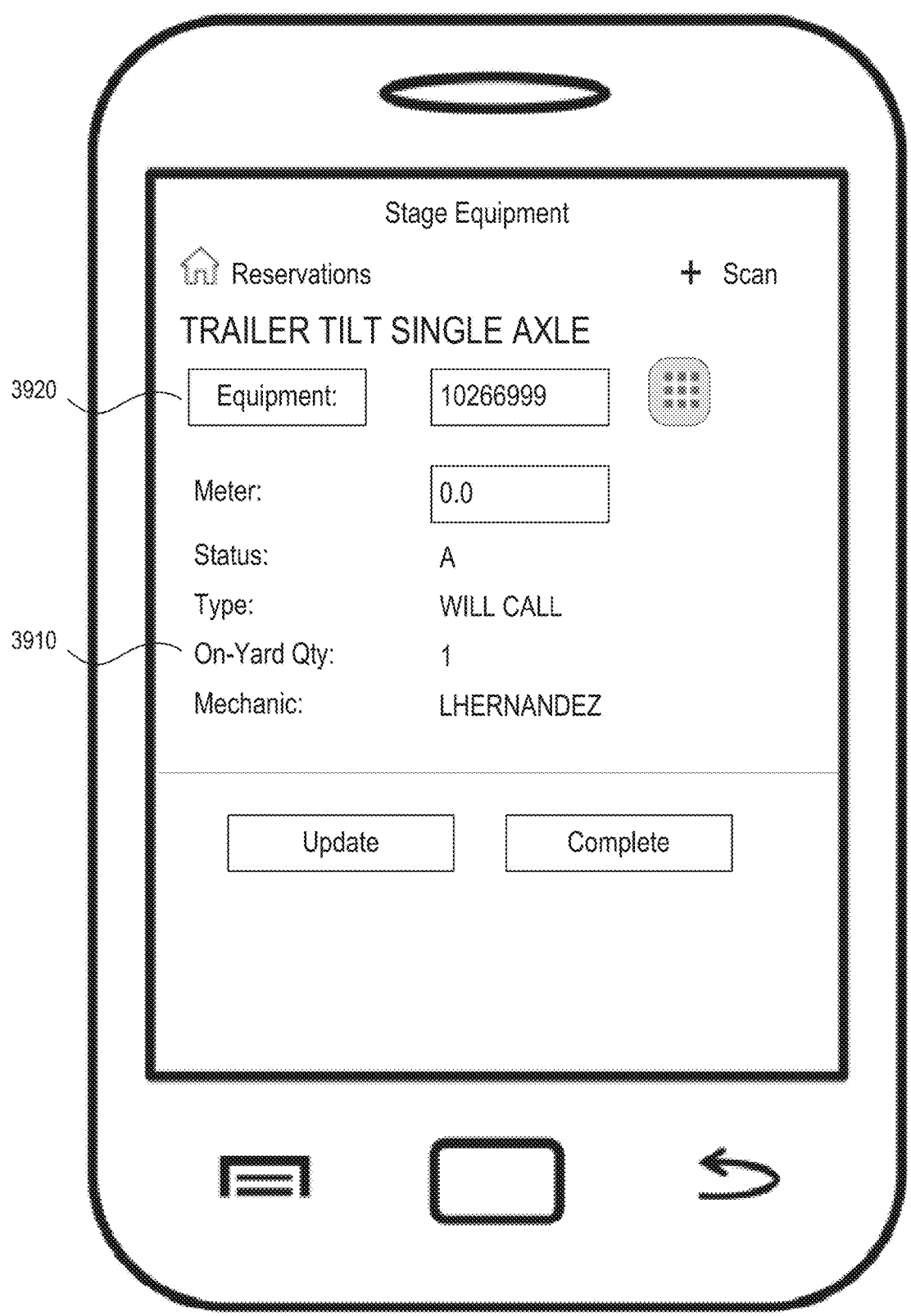
FIG. 39 illustrates one embodiment of a display on a mobile device in connection with a stage equipment screen and operations related thereto.

FIG. 39 illustrates one embodiment of a display on a mobile device in connection with a stage equipment screen and operations related thereto. Equipment button 3920, and other buttons that can be actuated, can be a darker yellow than background yellow 3910.

Figure 40:
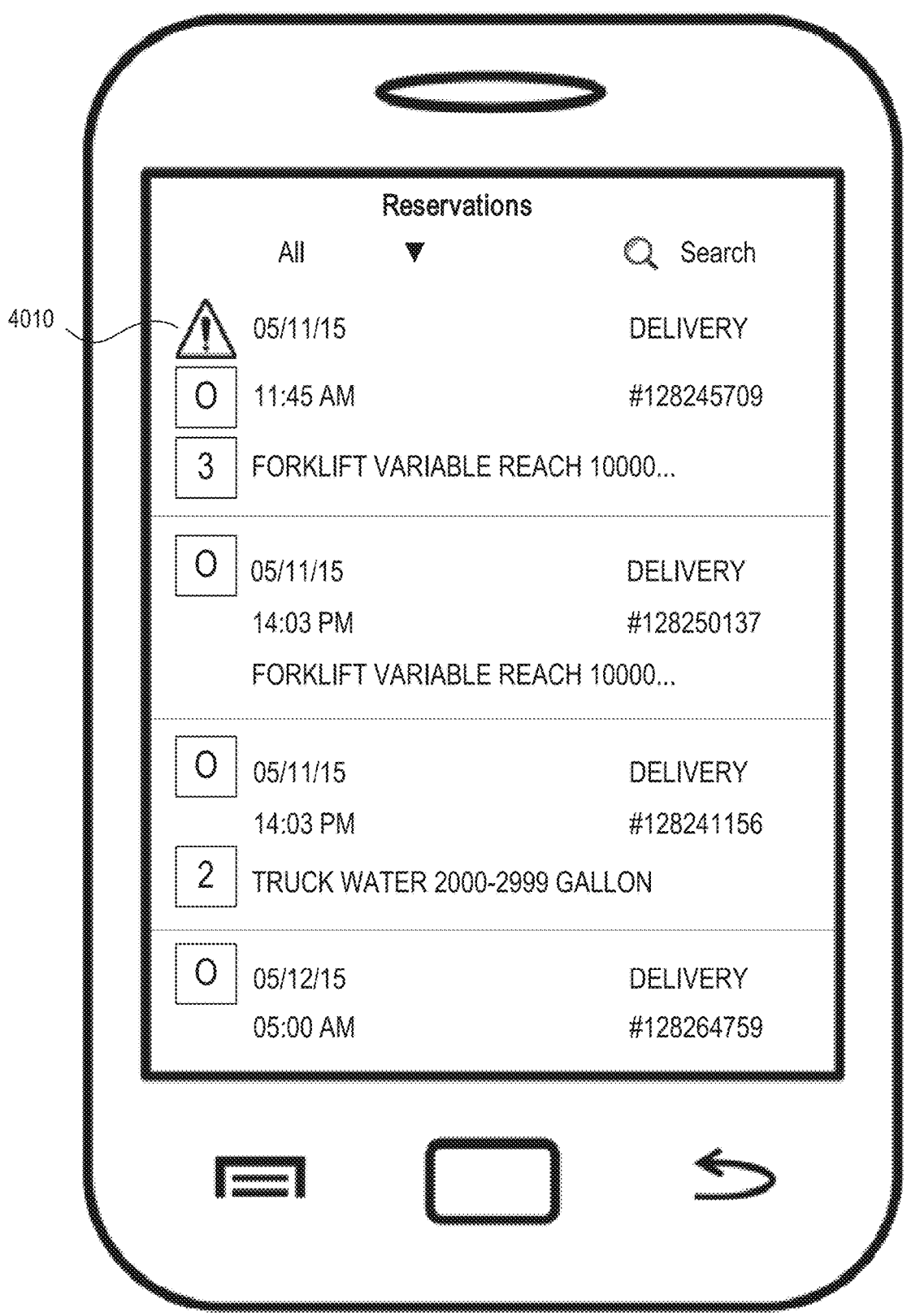
FIG. 40 illustrates one embodiment of a display on a mobile device in connection with reservations and operations related thereto.

FIG. 40 illustrates one embodiment of a display on a mobile device in connection with reservations and operations related thereto. An exclamation point associated with a yellow triangle 4010 can indicate a status of "overdue" or other non-ordinary condition.

The systems and methods disclosed and taught herein can apply to equipment rental as shown herein. However, the equipment rental systems and methods disclosed and taught herein can be extended to subject matter related to allocating an item to a consumer of that item, whereupon the item is configured for transfer of possession and successive transport. Thus, the teachings herein can be applied to additional solutions.

While various details have been set forth in the foregoing description, it will be appreciated that the various aspects of the equipment staging process may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

It is worthy to note that any reference to "one aspect," "an aspect," "one embodiment," or "an embodiment" means that a particular method, feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular methods, features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

As will be evident to a person of skill in the art, software comprising and/or capable of carrying out instructions operable to carry out staging functionality, decisions and calculations can be developed and employed. Such software can be embodied in a non-transitory computer-readable medium storing executable instructions.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Any of the U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described systems, methods, applications and platform(s), components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "in operative communication", "operably connected," or the like to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A graphical user interface for utilizing a synchronization server to correct records in a database in response to actuating an element of the graphical user interface, the graphical user interface associated with a mobile device system for staging equipment at an equipment rental facility, the graphical user interface comprising a display and at least one processor and operatively associated memory, the graphical user interface configured to:
    identify, by accessing data in a reservations database in operative communication with a wireless device, a reservation by a customer for rental of a first equipment asset at the equipment rental facility, wherein the first equipment asset is available for rental at a time of the reservation;
    create an electronic record associated with the first equipment asset, the electronic record associated with a first status that reflects that the first equipment asset is available for rental at the time of reservation;
    display, on the graphical user interface a first visual element corresponding to a first staging parameter;
    determine, at a future time after the time of the reservation, that the first equipment asset has become temporarily or permanently unavailable for rental, thereby resulting in a records discrepancy;
    display on the graphical user interface that an earlier change to a record resulted in an invalid equipment status error;
    display on an actuatable element on the graphical user interface a method to correct a data error;
    transmit an identifier associated with a second equipment asset to the reservations database;
    receive, by the reservations database, the equipment number of the second equipment asset;
    synchronize, in response to activating the actuatable element, by a synchronization server, a record associated with the mobile device and a record associated with the reservations database, thereby correcting the records discrepancy;

correct in the reservations database the records discrepancy; and stage the second equipment asset thereby providing it to the customer.

2. The graphical user interface of claim 1, wherein the first equipment asset has become unavailable due to an update by a service department of the equipment rental facility.

3. The graphical user interface of claim 1, wherein the identifier of the second equipment asset is the equipment number of the second equipment asset.

4. The graphical user interface of claim 3, wherein the equipment number of the second asset is obtained by scanning, by the mobile device, a barcode on the second equipment asset.

5. The graphical user interface of claim 1, wherein the equipment number of the second asset is obtained by entering it into a field in the user interface.

6. The graphical user interface of claim 1, wherein an error status is indicated by a visual indicator on the graphical user interface.

7. The graphical user interface of claim 6, wherein the graphical user interface displays a message labeled "Error".

8. The graphical user interface of claim 7, wherein a banner is displayed.

9. The graphical user interface of claim 6, wherein the visual indicator is removed upon correction of the records discrepancy.

\* \* \* \* \*